United States Patent
Hakeem et al.

(10) Patent No.: US 9,726,067 B2
(45) Date of Patent: Aug. 8, 2017

(54) METHOD FOR ADJUSTING A GRILLE SHUTTER OPENING

(71) Applicant: Ford Global Technologies, LLC, Dearborn, MI (US)

(72) Inventors: Mohannad Hakeem, Dearborn, MI (US); Shuya Shark Yamada, Novi, MI (US); Patrick Shearer, Allen Park, MI (US); Joseph Patrick Whitehead, Belleville, MI (US); Eric Krengel, Dearborn, MI (US); Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 225 days.

(21) Appl. No.: 14/591,789

(22) Filed: Jan. 7, 2015

(65) Prior Publication Data
US 2016/0194999 A1  Jul. 7, 2016

(51) Int. Cl.
| | |
|---|---|
| *F01P 7/02* | (2006.01) |
| *F01P 7/10* | (2006.01) |
| *F01P 7/12* | (2006.01) |
| *F01M 5/00* | (2006.01) |
| *F01M 13/00* | (2006.01) |
| *F02M 25/07* | (2006.01) |
| *F01M 1/16* | (2006.01) |

(Continued)

(52) U.S. Cl.
CPC ............ *F01P 7/10* (2013.01); *F01M 1/16* (2013.01); *F01M 5/007* (2013.01); *F01M 13/00* (2013.01); *F01P 7/12* (2013.01); *F02M 25/07* (2013.01); *B60K 11/085* (2013.01); *F01M 2001/165* (2013.01); *F01M 2013/0077* (2013.01); *F01P 7/026* (2013.01); *F01P 7/16* (2013.01)

(58) Field of Classification Search
CPC ...... F01P 7/12; F01P 7/10; F01P 7/026; F01P 7/16; B60K 11/085
USPC ...................................... 123/41.05
See application file for complete search history.

(56) References Cited

U.S. PATENT DOCUMENTS 5,897,597 A * 4/1999 O'Daniel .............. G01M 3/025
                                                        123/574
7,409,928 B2   8/2008 Rizoulis et al.
(Continued)

FOREIGN PATENT DOCUMENTS

JP   2012171565 A  *  9/2012
JP   2013036452 A  *  2/2013

OTHER PUBLICATIONS

MacFarlane, Kevin et al., "Method and System for Adjusting Grille Shutters based on Temperature and Position Feedback," U.S. Appl. No. 14/092,495, filed Nov. 27, 2013, 51 pages.
(Continued)

*Primary Examiner* — Jacob Amick
*Assistant Examiner* — Charles Brauch
(74) *Attorney, Agent, or Firm* — Julia Voutyras; McCoy Russell LLP

(57) ABSTRACT

Methods and systems are provided for adjusting a grille shutter opening based on an estimated amount of fuel in oil dilution. In one example, a method may include adjusting a grille shutter opening to a closed position in response to an oil dilution amount above a threshold, the position determined based on the oil dilution amount in addition to each of engine coolant temperature and acceleration/deceleration.

20 Claims, 8 Drawing Sheets

(51) Int. Cl.
*B60K 11/08* (2006.01)
*F01P 7/16* (2006.01)

(56) References Cited

U.S. PATENT DOCUMENTS

| | | |
|---|---|---|
| 7,493,883 B2 | 2/2009 | Takahashi |
| 8,161,949 B2 | 4/2012 | Johnson |
| 8,341,951 B2 | 1/2013 | Prior et al. |
| 8,516,816 B2 | 8/2013 | Pursifull et al. |
| 8,655,545 B2 | 2/2014 | Yu et al. |
| 8,662,569 B2 | 3/2014 | Klop |
| 2010/0059013 A1* | 3/2010 | Narayanakumar  F01M 13/0416 123/195 C |
| 2010/0300413 A1* | 12/2010 | Ulrey ........................ F02D 9/12 123/518 |
| 2011/0137530 A1* | 6/2011 | Kerns ........................ F01P 7/10 701/49 |
| 2011/0246023 A1* | 10/2011 | Lockwood ................ F01P 7/10 701/36 |
| 2012/0037134 A1* | 2/2012 | Jankovic ............. F02D 41/0002 123/568.21 |
| 2013/0263590 A1 | 10/2013 | Kempf et al. |
| 2014/0251239 A1 | 9/2014 | Richards et al. |
| 2015/0059719 A1 | 3/2015 | Bidner |

OTHER PUBLICATIONS

Pursifull, Ross D., "Method and System for Supplying Liquefied Petroleum Gas to a Direct Fuel Injected Engine," U.S. Appl. No. 14/532,756, filed Nov. 4, 2014, 39 pages.

Pursifull, Ross D. et al., "Method for Direct Injection of Supercritical Fuels," U.S. Appl. No. 14/579,091, filed Dec. 22, 2014, 53 pages.

\* cited by examiner

METHOD FOR ADJUSTING A GRILLE SHUTTER OPENING

FIELD

The present description relates generally to methods and systems for controlling a vehicle engine.

BACKGROUND/SUMMARY

Vehicles operating with combustion cylinders may be configured to inject fuel directly into the fuel chamber. In such a configuration, fuel injected into the cylinder may impinge on the cylinder bore walls and accumulate in the oil pan in the crankcase. If the rate of accumulation exceeds the rate of evaporation of fuel from the crankcase (e.g., via a positive crankcase ventilation (PCV) system), the fuel may dilute oil in the oil pan of the crankcase. Fuel in oil dilution may degrade oil quality, cause fuel odors in the engine oil, and degrade oxygen intake sensors via evaporation.

Other attempts to address fuel in oil dilution include selectively providing coolant to the engine based on fuel in oil dilution. One example approach is shown by Takahashi et al. in U.S. Pat. No. 7,493,883. Therein, a cooling jacket surrounding the crankcase of the engine is included in the coolant circuit when oil in fuel dilution is below a threshold level, and is bypassed in the coolant circuit when oil in fuel dilution is above a threshold level to raise the temperature of the crankcase and provide greater fuel vaporization.

However, the inventors herein have recognized potential issues with such systems. As one example, fuel economy may be degraded in instances where the engine is at a high temperature due to fuel in oil dilution but an acceleration event is commanded. As a further example, coolant may only be fully provided to the engine crankcase or absent from the cooling jacket, and not partially provided to the cooling jacket, providing a less than desired level of temperature control of the engine crankcase.

In one example, the issues described above may be addressed by selectively adjusting a grille shutter opening responsive to fuel in oil dilution. The adjusting of the grille shutter responsive to fuel in oil dilution may be in coordination with adjusting the grille shutter to control coolant temperature and aerodynamics for maintenance of engine cooling performance and improved fuel economy, respectively.

As one example, in response to a fuel in oil dilution level above an upper threshold, a grille shutter may be adjusted from a first mid-point position further from the fully closed position to a second mid-point position closer to the fully closed position. Temperatures within the engine compartment may then increase, and more fuel may vaporize out of the oil in the crankcase. In response to a fuel in oil dilution level returning to below the upper threshold, a grille shutter may be adjusted from the second mid-point position to a different position based on one or more of coolant temperature, charge air cooler temperature, and various vehicle motion parameters. In this way, fuel in oil dilution may be improved while still enabling accurate control of coolant temperature and improving fuel economy.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
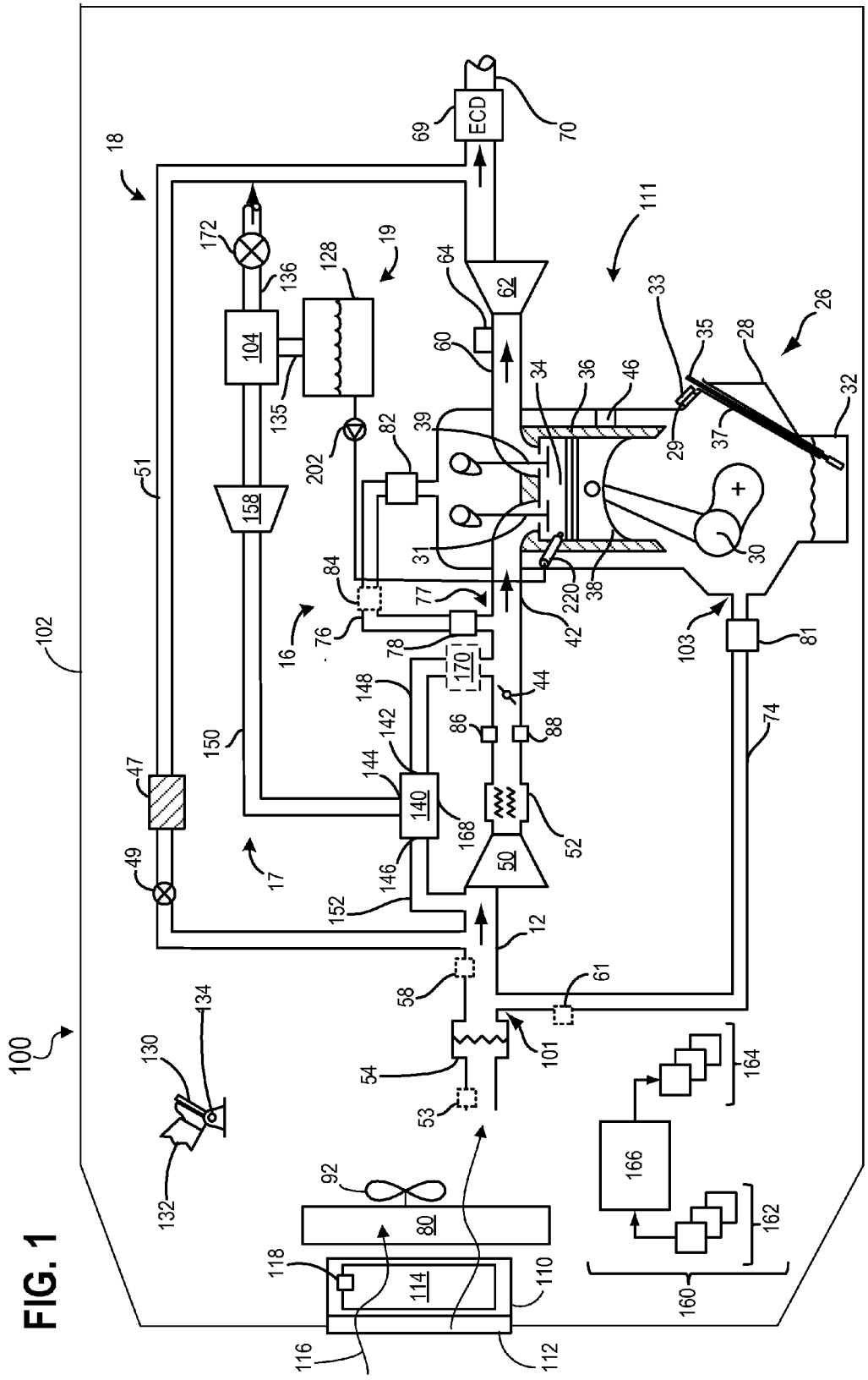
FIG. 1 depicts an engine system with adjustable grille shutters, configured with a turbocharger, direct fuel injectors for injecting gasoline, positive crankcase ventilation, exhaust gas recirculation, and fuel vapor purge.
Figure 2:
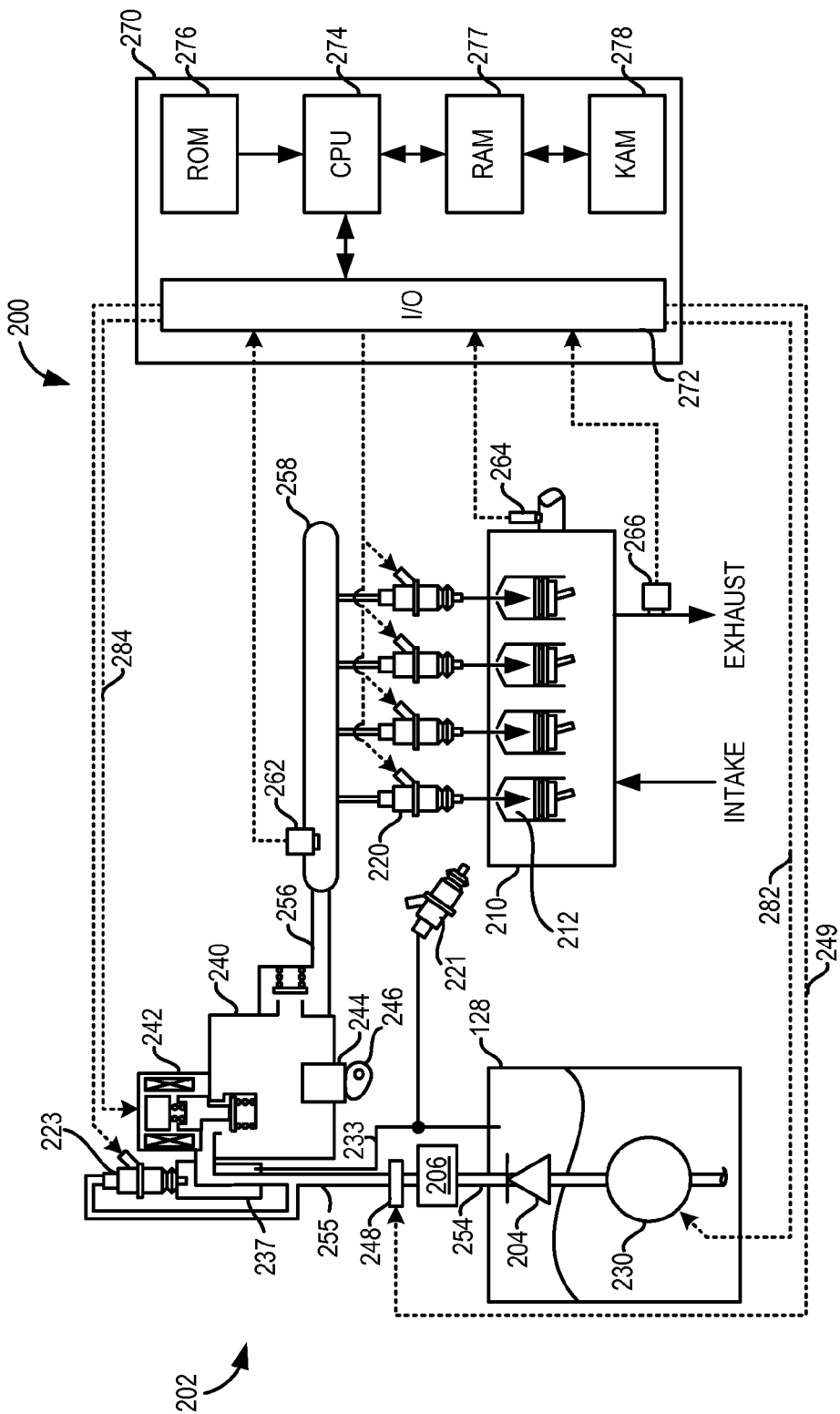
FIG. 2 depicts a fuel system configured for direct fuel injection.
Figure 3:
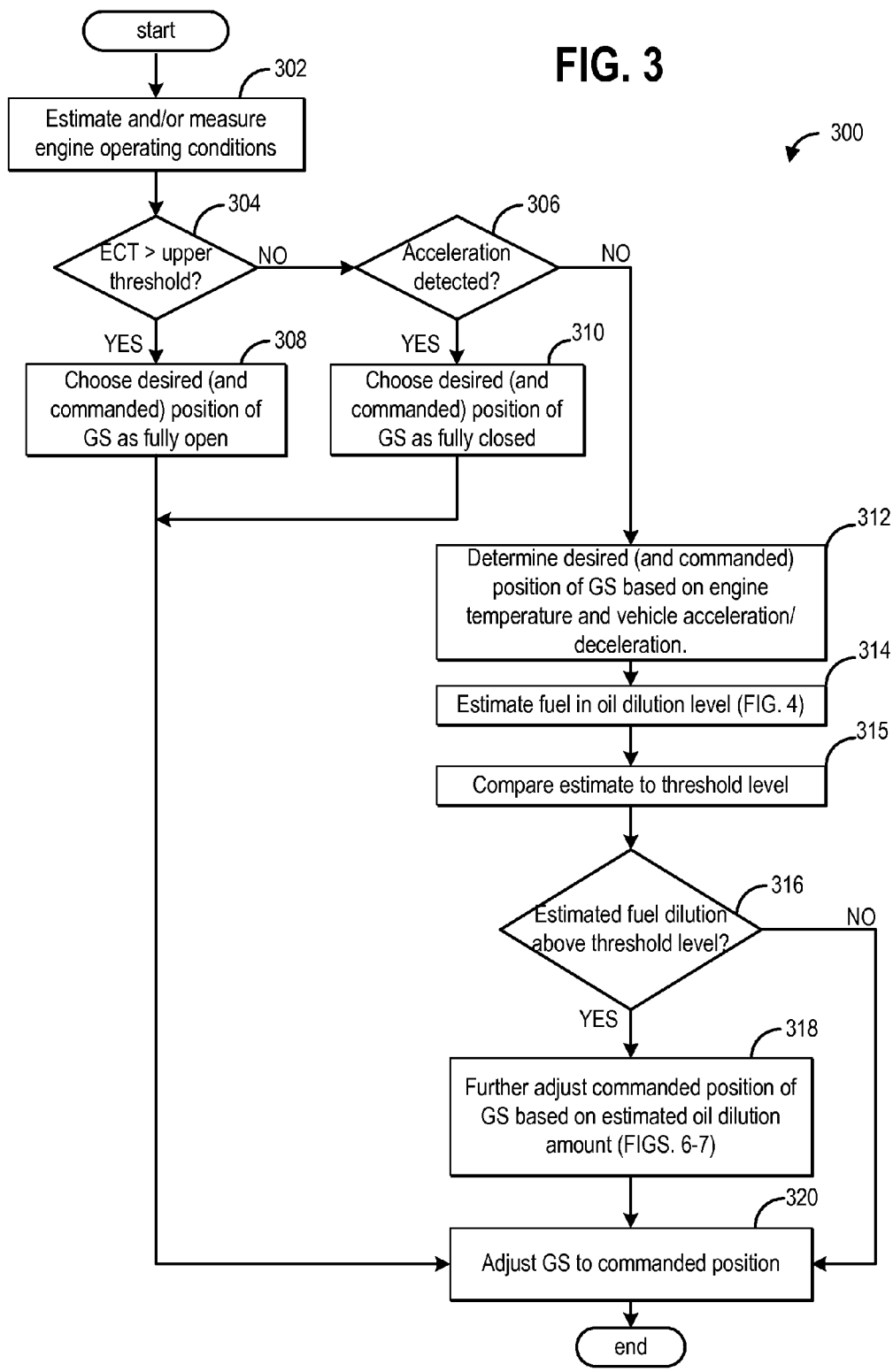
FIG. 3 depicts a flowchart for adjusting a grille shutter opening based on ECT, acceleration/deceleration, additional engine operating conditions including CAC temperature, and oil dilution.
Figure 5:
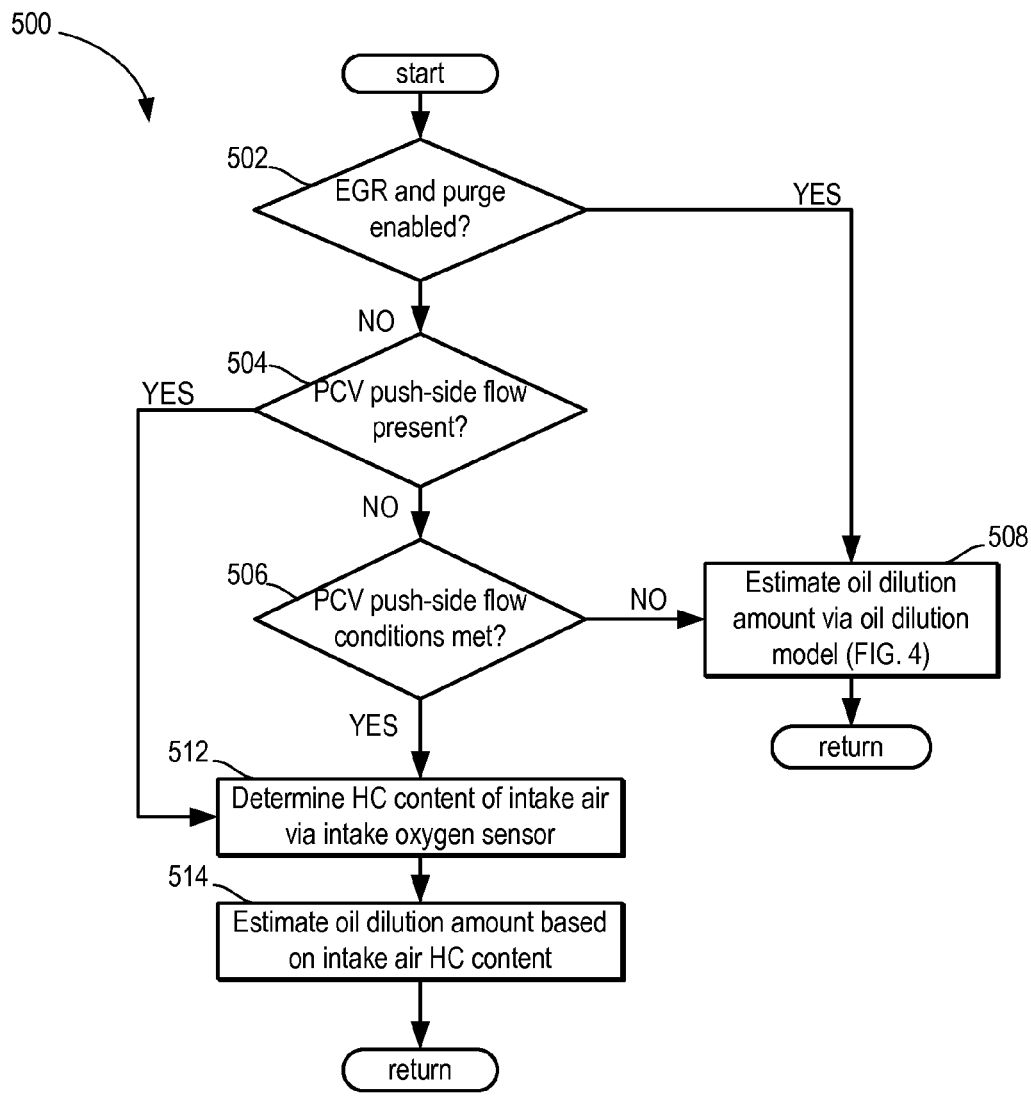
FIG. 5 depicts a flowchart for a PCV fuel compensation strategy used to estimate an amount of oil dilution based on intake air oxygen sensor measurements.
Figure 6:
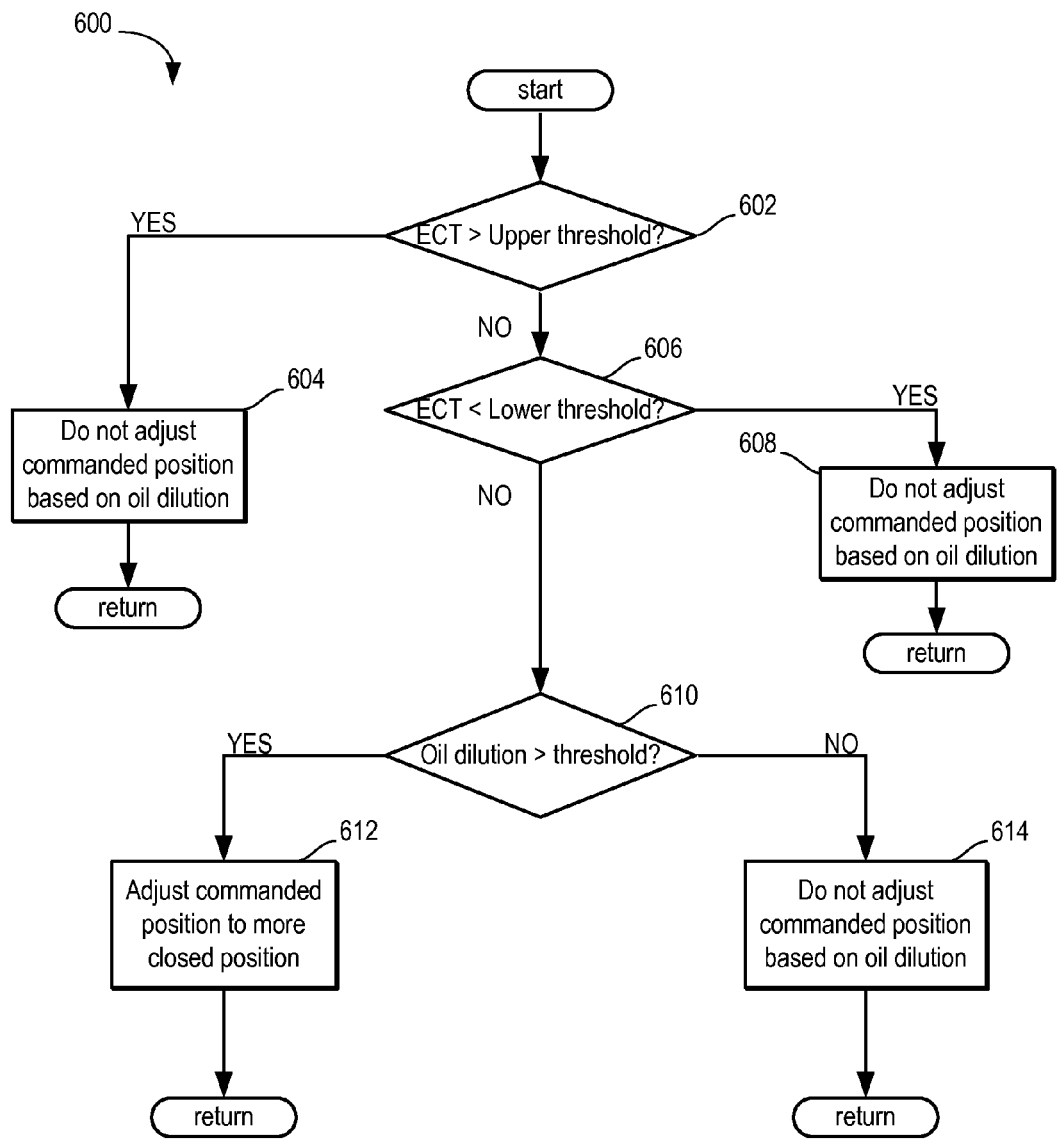
FIG. 6 depicts a flowchart for selectively adjusting a commanded grille shutter position based on each of ECT and oil dilution.
Figure 7:
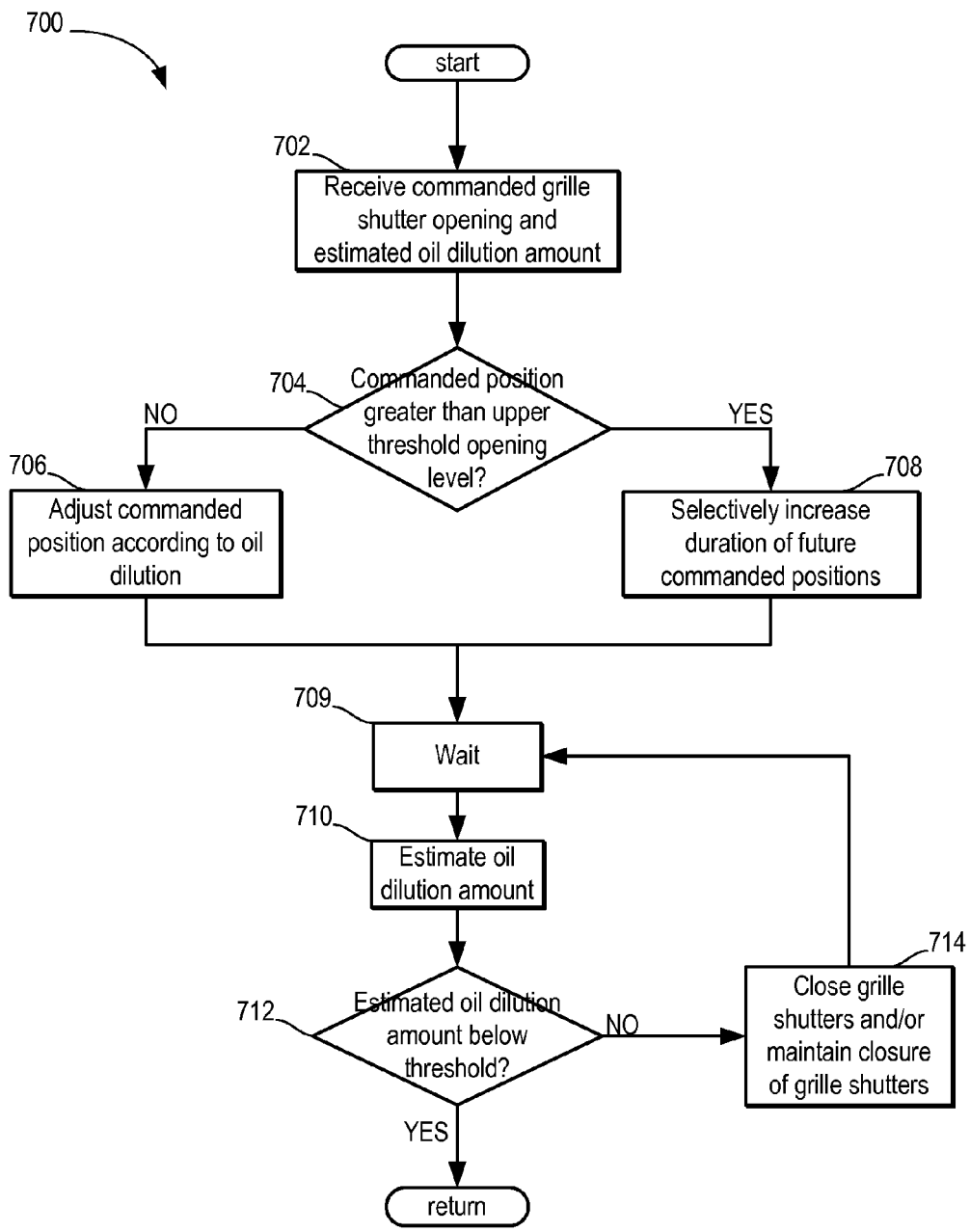
FIG. 7 depicts a flowchart for adjusting a commanded grille shutter position via a second method.
Figure 8:
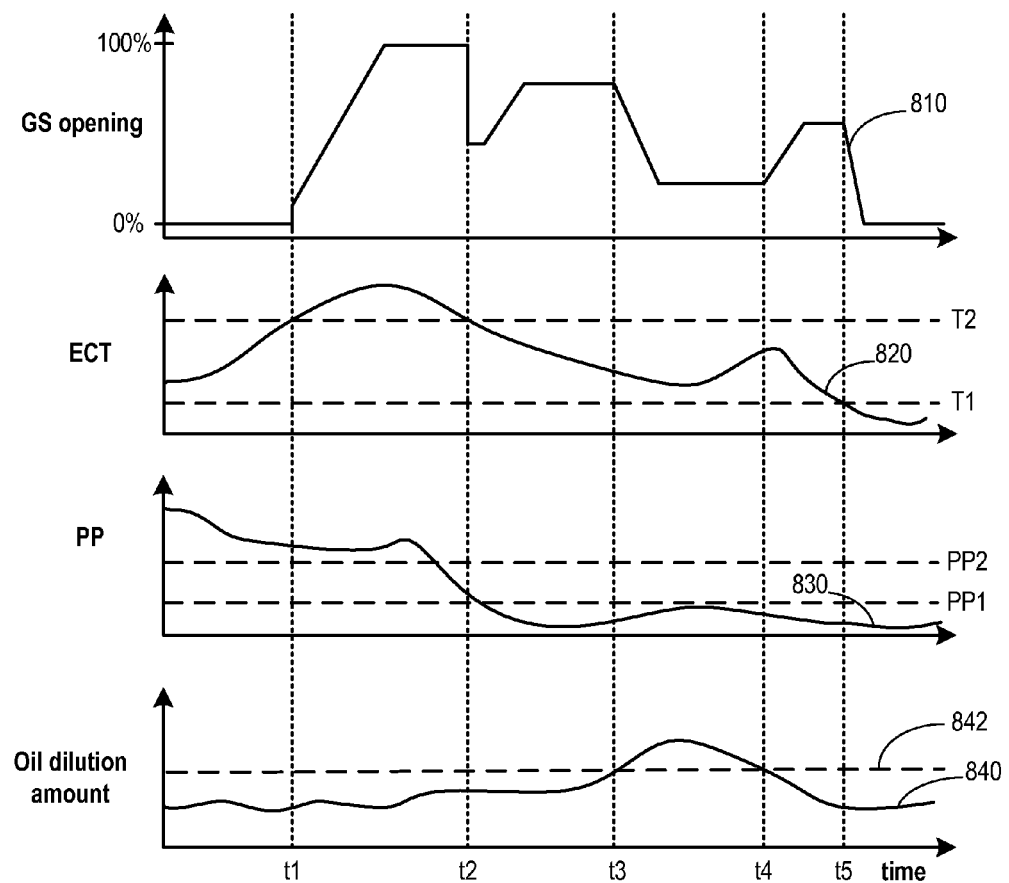
FIG. 8 depicts a prophetic sequence of adjusting a grille shutter opening based on each of ECT and acceleration/deceleration, and selectively adjusting the opening further based on oil dilution.

The following description relates to systems and methods for adjusting a grille shutter opening based on fuel in oil dilution. FIGS. 1 and 2 depict an example engine system with which these methods may be executed. FIG. 3 provides a high-order flowchart for adjusting the grille shutters based on several engine operating conditions including ECT, acceleration/deceleration, and oil dilution. Oil dilution may be estimated via the routine provided at FIG. 4. One method of estimating the oil dilution may include estimating a dilution amount based on the hydrocarbon content of the crankcase gases delivered to an intake air oxygen sensor, as depicted at FIG. 5. FIGS. 6-7 provide two methods for adjusting a commanded grille shutter position based on an estimated oil dilution amount, the commanded grille shutter position determined based on other engine operating conditions. FIG. 8 shows a graphical example of adjusting grille shutters based on engine coolant temperature, acceleration/deceleration, and oil dilution amount.

FIG. 1 shows an example embodiment of a grille shutter system 110 and an engine system 100, in a motor vehicle 102, illustrated schematically. Engine system 100 may be included in a vehicle such as a road vehicle, among other types of vehicles. While the example applications of engine system 100 will be described with reference to a vehicle, it should be appreciated that various types of engines and vehicle propulsion systems may be used, including passenger cars, trucks, etc.

An example configuration of a multi-cylinder engine is generally depicted at 111, which may be included in a propulsion system of an automobile. Engine 111 may be controlled at least partially by a control system 160 of the vehicle including controller 166 and by input from a vehicle operator 132 via an input device 130. In this example, input device 130 includes an accelerator pedal and a pedal position sensor 134 for generating a proportional pedal position signal PP (not shown).

In the depicted embodiment, engine 111 is a boosted engine coupled to a turbocharger including a compressor 50 driven by a turbine 62. Further, engine 111 is configured to inject fuel from fuel tank 128 directly into combustion chamber 34 via direct fuel injector 220. Thus, in examples where the fuel in fuel tank 128 is gasoline, engine 111 is a gasoline turbocharged direct injection engine. Specifically, fresh air is introduced along intake passage 12 into engine 111 via air filter 54 and flows to compressor 50. The compressor may be a suitable intake-air compressor, such as a motor-driven or driveshaft driven supercharger compressor. In the engine system 100, the compressor is shown as a turbocharger compressor mechanically coupled to turbine 62 via a shaft (not shown), the turbine 62 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed and other operating conditions. In yet another embodiment, the turbine and compressor may be included as a supercharger.

Engine 111 may include a lower portion of the engine block, indicated generally at 26, which may include a crankcase 28 encasing a crankshaft 30. Crankcase 28 may include an oil sump 32, otherwise referred to as an oil well, holding engine lubricant (e.g., oil) positioned below the crankshaft 30. During some conditions, fuel may enter crankcase 28 via engine cylinders, for example. An oil fill port 29 may be disposed in crankcase 28 so that oil may be supplied to oil sump 32. Oil fill port 29 may include an oil cap 33 to seal oil port 29 when the engine is in operation. A dip stick tube 37 may also be disposed in crankcase 28 and may include a dipstick 35 for measuring a level of oil in oil sump 32. In addition, crankcase 28 may include a plurality of other orifices for servicing components in crankcase 28. These orifices in crankcase 28 may be maintained closed during engine operation so that a crankcase ventilation system (described below) may operate during engine operation. Further, crankcase 28 may include an air-to-fuel ratio sensor for sensing an air-to-fuel ratio in a positive crankcase ventilation (PCV) system 16.

The upper portion of engine block 26 may include a combustion chamber (e.g., cylinder) 34. The combustion chamber 34 may include combustion chamber walls 36 with piston 38 positioned therein. Piston 38 may be coupled to crankshaft 30 so that reciprocating motion of the piston is translated into rotational motion of the crankshaft. Combustion chamber 34 may receive fuel from fuel injectors (e.g., direct fuel injector 220) and intake air from intake manifold 42 which is positioned downstream of throttle 44. The engine block 26 may also include an engine coolant temperature (ECT) sensor 46 input into a controller 166 (described in more detail below herein).

Motor vehicle 102 further includes a grille system 110 including a grille 112 providing an opening (e.g., a grille opening, a bumper opening, etc.) for receiving ambient air flow 116 through or near the front end of the vehicle and into the engine compartment. For this reason, ambient air flow 116 is herein also referred to as an engine front-end airflow. Ambient air flow 116 may then be utilized by radiator 80, engine cooling fan 92, and a low-temperature radiator (not shown) to keep the engine and/or transmission cool. The engine cooling fan 92 may be adjusted to further increase or decrease the air flow to the engine components.

Grille shutters 114 may be selectively adjusted to affect the amount of ambient air flow 116 that is passed through grille 112. As used herein, adjusting grille shutters 114 includes adjusting the size of a grille shutter opening resultant from the position or degree of inclination of grille shutters 114. The position or degree of inclination of grille shutters 114 may be estimated based on feedback from grille shutter position sensor 118. A grille shutter opening may be a percent of openness from 0-100%, where 0% is completely closed and 100% is completely open. For example, grille shutters 114 may be adjusted to be completely shut (0% grille shutter opening) and prevent the flow of air through grille 112, or may be adjusted to be completely open (100% grille shutter opening) and allow an unrestricted flow of air through grille 112. Furthermore, grille shutters 114 may be adjusted to any one of an infinite number of positions between completely closed and fully open (corresponding to a grille shutter opening between 0% and 100%). In this way, an engine front-end airflow (e.g., ambient airflow 116) may be adjusted by adjusting a grille shutter position.

While this example refers to operation of grille shutters, various other devices may also be used that variably restrict airflow entering the engine compartment, such as a variable wing or spoiler, as one example, that can be adjusted to various angles including mid-point angles between maximum and minimum angle positions.

As used herein, the terms "open grille shutter position" and "open position" refer to a grille shutter position that is more than half open, or put another way, a grille shutter opening that is greater than 50%. Similarly, "closed grille shutter position" and "closed position" refer to a grille shutter position that is less than half open, or put another way a grille shutter opening that is less than. Further, a "fully open" or "completely open" position refers to approximately a 95%-100% grille shutter opening, while a "fully closed" or "completely closed" position refers to approximately a 0-5% grille shutter opening. As used herein, a mid-point opening refers to grille shutter opening between fully closed (0% open) and fully open (100% open).

When grille shutters 114 are completely shut, hot air within the engine compartment may remain in the engine compartment and contribute to an increase in the ambient temperature within the engine compartment. When grill shutters 114 are completely open, ambient air flow 116 may serve to circulate hot air out of the engine compartment, thereby reducing the ambient temperature within the engine compartment. Adjusting grille shutters 114 to a degree of inclination between completely closed and completely open may result an ambient airflow 116 and an ambient temperature greater than those that arise when grille shutters 114 are completely open. In this way, the temperature within engine compartment 102 may be at least partly controlled by adjusting the degree of inclination of the grille shutters. Furthermore, as described in further detail below, a grille shutter opening may be adjusted in response to various engine operating conditions such as engine speed and load, vehicle speed, pedal position, conditions of the CAC (CAC temperature, pressure, and efficiency), engine temperatures, ECT, fuel in oil dilution level, intake air oxygen content, feedback grille shutter position, etc., in order to improve one or more of fuel economy, engine performance, and oil dilution levels. For example the aerodynamics of vehicle 102 may be improved with a fully closed grille shutter 114 via a streamlining of the front end of the vehicle, and therefore during some conditions a fully closed grille shutter may improve fuel economy.

In one example, an engine system may detect fuel in oil dilution in the crankcase (e.g., via operation in combination with routine 400 at FIG. 4, having corresponding instructions stored in the memory of controller 166), and in response may adjust a grille shutter 114 to a more closed position. In one example, the grille shutter opening may be adjusted to 0%. In another example, if the grille shutter opening was at 100% or at a mid-point opening, the grille shutter opening may be adjusted to position closer to 0% but not fully closed. In this way, ambient temperature may be raised in the engine compartment and vaporization of fuel within the crankcase oil may be increased.

In another example, an engine controller may anticipate an acceleration event (e.g., from operator 132 via input device 130) in the near future. In response to an anticipated acceleration event, the engine controller may adjust the grille shutter opening to 100%. In another example, if the grille shutter was at 0% or at an intermediate position, the grille shutter opening may be adjusted to a position closer to 100% but not fully opening. In this way, ambient temperature may be decreased in the engine compartment and overheating of the engine via the anticipated acceleration may be avoided, thereby improving engine efficiency. Further examples of adjusting grille shutter responsive to various engine conditions are discussed with references to FIGS. 3, 6-8.

Air may enter the engine compartment via grille system 110 and be introduced to fresh air intake passage 12. Fresh air intake passage 12 may include air filter 54, and may further include a barometric pressure sensor (BP sensor) 53, upstream of air filter 54, for providing an estimate of barometric pressure (BP), as well as a compressor inlet pressure (CIP) sensor 58 may be coupled in intake passage 12 downstream of air filter 54 and upstream of compressor 50 to provide an estimate of the compressor inlet pressure (CIP). These sensors may be in electronic communication with controller 166.

Engine intake may be in fluid communication with a positive crankcase ventilation (PCV) system 16, a fuel vapor purge (FVP) system 17 and an exhaust gas recirculation (EGR) system 18. Specifically, crankcase ventilation tube 74 of PCV system 16 may be coupled to intake passage 12 upstream of compressor 50 via a first end 101 and may be further coupled to crankcase 28 via an oil separator 81 and a second end 103. Crankcase ventilation tube 74 may couple crankcase 28 to intake passage 12 downstream of air filter 54 and upstream of compressor 50. During boosted conditions, gases in the crankcase may be vented from the crankcase through tube 74 in a controlled manner. In some examples, the gases delivered from crankcase 28 to intake air passage 12 via tube 74 and first end 101 may include vaporized fuel that had previously escaped from combustion chamber 34 and diluted into the oil of oil sump 32. For this reason, crankcase ventilation tube 74 may herein also be referred to as a push-side conduit or a push-side pipe, and first end 101 may be referred to herein as a push-side port. Further, gases traveling in such a manner may be referred to herein as PCV push-side flow, and push-side PCV flow is said to be "active" or "present" when gases are flowing from crankcase 28 to intake air passage 12 via tube push-side conduit 74 and push-side port 101. However, during non-boosted conditions, a vacuum created in intake manifold 42 may induce air from intake passage 12 to flow into crankcase 28 via conduit 74.

Conduit 76 of PCV system 16 may deliver gases from crankcase 28 to intake manifold 42, downstream of each of compressor 50, IAO2 sensor 88, and throttle 44. During boosted conditions, PCV valve 78 may prevent crankcase gases from flowing through conduit 76 and into intake manifold 42. However during non-boosted conditions, a vacuum may be created in intake manifold, and the vacuum may pull gases from crankcase 28 through conduit 76 and into intake manifold 42 via PCV valve 78 and port 77. For this reason, conduit 76 may also be referred to herein as a pull-side pipe or a pull-side conduit, while port 77 may be referred to herein as a pull-side port. Further, gases traveling in such a manner may be referred to herein as PCV pull-side flow, and pull-side PCV flow is said to be "active" or "present" when gases are flowing from crankcase 28 to intake manifold 42 via tube pull-side conduit 76 and pull-side port 77. In some examples, the gases delivered from crankcase 28 to intake manifold 42 via pull-side conduit 76 may include vaporized fuel that had previously escaped from combustion chamber 34 and diluted into the oil of oil sump 32.

Fuel vapor purge system 17 may be fluidly connected to intake air passage 12 upstream of compressor 50 via duct 152 and to intake manifold 42 downstream of throttle 44 via duct 148, and may be configured to deliver fuel vapors from fuel tank 128 to each of intake passage 12 and intake manifold 42. In one example, when FVP is enabled, fuel vapors may be delivered to the intake system via duct 152 during boosted conditions, and via duct 148 during non-boosted conditions. Passage 51 of EGR system 18 may direct exhaust flow downstream of turbine 62 in exhaust passage 60 back to intake passage 12, downstream of air filter 54 and upstream of compressor 50.

Intake manifold 42 may include pressure sensor 86 for measuring an intake manifold pressure (MAP). Intake manifold 42 further includes intake air oxygen (IAO2) sensor 88 for measuring an oxygen content of air entering cylinder 34. IAO2 sensor 88 may be one of a linear oxygen sensor universal or wide-range oxygen sensor, a two-state oxygen sensor, and a heated oxygen sensor. IAO2 sensor 88 may be positioned downstream of each of the fluid connections to the FVP and EGR systems 17 and 18, and upstream of intake valve 31 such that oxygen content is measured after all effluents have been introduced to the intake stream. Further, IAO2 sensor may be positioned downstream of push-side conduit 74 but upstream of pull-side conduit 76. During some conditions, when EGR and fuel vapor purge are inactive and push-side PCV flow is active (e.g., during boosted conditions), measurements from IAO2 sensor 88 may be used to determine a hydrocarbon (HC) concentration of gases from crankcase 28. During other conditions, measurements from IAO2 sensor 88 may be used to determine an amount of recirculated exhaust gas to introduce to intake manifold 42 via EGR system 18.

As shown in FIG. 1, compressor 50 is coupled to charge air cooler (CAC) 52. In an alternate embodiment, the throttle 44 may be coupled to the engine intake manifold 42, downstream of the CAC 52. From the compressor, the hot compressed air charge enters the inlet of the CAC 52, cools as it travels through the CAC, passes through the throttle valve 44, and then exits toward the intake manifold 42. In the embodiment shown in FIG. 1, the CAC 52 is a water-to-air heat exchanger. As such, CAC 52 comprises a series of coolant tubes which water or coolant may flow through to cool the charge air passing over the outside of the coolant tubes. The coolant tubes of CAC 52 may be connected to a low-temperature radiator circuit (not shown). The low-temperature radiator circuit may include a low-temperature radiator, coolant tubing, and a coolant pump (not shown). The low-temperature radiator may cool warmed coolant flowing from the CAC 52. As such, the coolant pump may pump cooled coolant from the low-temperature radiator, through the coolant tubing, and to the CAC 52. Coolant then flows through the coolant tubes of the CAC 52, thereby cooling warmer charge air passing through the CAC 52. As the coolant travels through the CAC, the temperature of the coolant may increase. Warmed coolant may then travel from the CAC 52 back to the low-temperature radiator to be cooled again.

A throttle 44 may be disposed in intake passage 12 to control the airflow entering intake manifold 42 and may be preceded upstream by compressor 50 followed by charge air cooler 52, for example. Compressor 50 may compress the intake air to engine 111, thereby boosting intake air pressure and density providing boosted engine conditions (e.g., manifold air pressure>barometric pressure), for example during increased engine loads. An air filter 54 may be positioned upstream compressor 50 and may filter fresh air entering intake passage 12. In the depicted example, throttle 44 is positioned upstream of PCV pull-side port 77 and FVP duct 148, and downstream of each of PCV push-side port 101, EGR passage 51, FVP duct 152, compressor 50, CAC 52, and IAO2 sensor 88.

Intake manifold 42 is coupled to a series of combustion chambers 34 through a series of intake valves 31. It will be understood that although as depicted in FIG. 1, intake manifold 42 comprises only one section delivering effluent to only one combustion chamber 34, engine 111 may comprise multiple combustion chambers 34, only one of which is shown, and intake manifold 42 may comprise a plurality of intake manifold sections to deliver effluent from a common intake passage to the plurality of combustion chambers 34. The combustion chambers are further coupled to exhaust manifold 60 via a series of exhaust valves 39. In the depicted embodiment, a single exhaust manifold 60 is shown. However, in other embodiments, exhaust manifold 60 may include a plurality of exhaust manifold sections. Configurations having a plurality of exhaust manifold section may enable effluent from different combustion chambers to be directed to different locations in the engine system. Universal Exhaust Gas Oxygen (UEGO) sensor 64 is shown coupled to exhaust manifold 60 upstream of turbine 62. Alternatively, a two-state exhaust gas oxygen sensor may be substituted for UEGO sensor 64.

In the example of FIG. 1, a positive crankcase ventilation system (PCV) 16 is coupled to the engine fresh air intake 12 so that gases in the crankcase 28 may be vented in a controlled manner. During normal engine operation, gases in the combustion chamber 34 may escape past the piston. These blow-by gases may include unburned fuel, combustion products, and air. Blow-by gases can dilute and contaminate oil, causing corrosion to engine components and contributing to sludge build-up, reducing the protective and lubricating properties of the oil. At higher engine speeds, blow-by gases can increase crankcase pressure such that oil leakage may occur from sealed engine surfaces. The PCV system 16 may help to vent and remove blow-by gases from the engine crankcase in a controlled manner in order to mitigate these harmful effects of blow-by gases and may combine them with an engine intake stream so that they may be combusted within the engine. By redirecting blow-by gases to the engine intake, the PCV system 16 further aids in reducing engine emissions by precluding venting of blow-by gases to the atmosphere.

In one example, PCV system 16 may help to remove fuel in oil dilution of oil in engine crankcase 28. Specifically, when engine temperatures are above a threshold temperature, fuel diluted in crankcase oil may vaporize out of solution and instead may partially compose the blow-by gas ventilated by PCV system. The amount of vaporized fuel may increase with increased temperature. Thus, by increasing engine temperatures, for example by closing grille shutters 114 of engine system 100, more vaporized fuel may compose the blow-by gas of crankcase 28 and be ventilated out of crankcase, thereby reducing a fuel in oil dilution of oil in the crankcase. In this way, oil dilution may be improved during conditions where the PCV system is active.

The PCV system 16 includes a PCV valve 78 fluidly coupled to engine crankcase 28. As an example, the PCV valve 78 may be coupled to a valve cover in the engine, which may allow for the PCV system to draw blow-by gases from the engine while reducing the entrainment of oil from the crankcase. The PCV valve 78 may also be fluidly coupled to the engine intake manifold 42. The PCV valve gas flow rate may vary with engine conditions such as engine speed and load, and the PCV valve 78 may be calibrated for a particular engine application wherein the PCV valve gas flow rate may be adjusted as operating conditions change. As an example, when the engine is off, the PCV valve may be closed and no gases may flow through the PCV valve 78. When the engine speed is idling or low, or during deceleration when the intake manifold vacuum is relatively high, the PCV valve 78 may open slightly, allowing for restricted PCV valve gas flow rates. At engine speeds or loads higher than idling, intake manifold vacuum may lower, and the PCV valve 78 may allow for higher PCV valve gas flow rates. PCV valve 78 may include a conventional PCV valve or a push-pull type PCV valve. As one example, PCV valve 78 may be a check valve.

In some embodiments, crankcase ventilation tube 74 may include a pressure sensor 61 coupled therein. Pressure sensor 61 may be an absolute pressure sensor or a gauge sensor. One or more additional pressure and/or flow sensors may be coupled to the PCV system 16 at alternate locations. In one example, pressure sensor 61 may be configured as a gauge sensor, and barometric pressure sensor 58, coupled to intake passage 12 upstream of air filter 54, may be used in conjunction with pressure sensor 61. In some embodiments, a compressor inlet pressure (CIP) sensor 58 may be coupled in intake passage 12 downstream of air filter 54 and upstream of compressor 50 to provide an estimate of the compressor inlet pressure (CIP).

While the engine is running under light load and moderate throttle opening, such as during non-boosted conditions, the intake manifold air pressure may be less than crankcase air pressure. The lower pressure of the intake manifold 42 draws fresh air towards it, pulling air from the push-side conduit 74 through the crankcase (where it dilutes and mixes with combustion gases), out of the crankcase via the pull-side conduit 76 through the PCV valve 78, and into the intake manifold 42. However, during other conditions, such as heavy load or under boosted conditions, the intake manifold air pressure may be greater than crankcase air pressure. As such, intake air may travel through the PCV conduit 76 and into the crankcase 28.

Specifically, during non-boosted conditions (when intake manifold pressure (MAP) is less than barometric pressure (BP)), the PCV system 16 draws air into crankcase 28 via a breather or crankcase ventilation (vent) tube 74. A first end 101 of crankcase ventilation tube 74 may be mechanically coupled, or connected, to fresh air intake 12 upstream of compressor 50. In some examples, the first end 101 of crankcase ventilation tube 74 may be coupled to fresh air intake 12 downstream of air filter 54 (as shown). In other examples, the crankcase ventilation tube may be coupled to fresh air intake 12 upstream of air filter 54. In yet another example, the crankcase ventilation tube may be coupled to air filter 54. A second end 102, opposite first end 101, of crankcase ventilation tube 74 may be mechanically coupled, or connected, to crankcase 28 via an oil separator 81.

Still during non-boosted conditions, PCV system 16 may vent air out of crankcase 28 and into intake manifold 42 via pull-flow conduit 76 which, in some examples, may include a one-way PCV valve 78 to provide continual evacuation of gases from inside the crankcase 28 before connecting to the intake manifold 42. In one embodiment, the PCV valve 78 may vary its flow restriction in response to the pressure drop across it (or flow rate through it). However, in other examples conduit 76 may not include a one-way PCV valve. In still other examples, the PCV valve may be an electronically controlled valve that is controlled by controller 166. It will be appreciated that, as used herein, pull-side PCV flow refers to the flow of gases through conduit 76 and pull-side port 77 from the crankcase to the intake manifold 42. As an example, the pull-side PCV flow may be determined from the fuel (e.g., gaseous fuel) injection rate, the air/fuel ratio in the engine intake, and the exhaust oxygen content via exhaust gas sensor 64, using known methods.

As used herein, PCV backflow refers to the flow of gases through pull-side conduit 76 from the intake manifold 42 to the crankcase 28. PCV backflow may occur when intake manifold pressure is higher than crankcase pressure (e.g., during boosted engine operation). In some examples (such as the depicted example), PCV system 16 may be equipped with a check valve for preventing PCV backflow. It will be appreciated that while the depicted example shows PCV valve 78 as a passive valve, this is not meant to be limiting, and in alternate embodiments, PCV valve 78 may be an electronically controlled valve (e.g., a powertrain control module (PCM) controlled valve) wherein a controller 166 of control system 160 may command a signal to change a position of the valve from an open position (or a position of high flow) to a closed position (or a position of low flow), or vice versa, or any position there-between.

During boosted conditions (when MAP is greater than BP), gases flow from the crankcase, through oil separator 81 and push-side conduit 74, and into fresh air intake 12 and eventually into the combustion chamber 34. This may be done in a stale air manner where no intake manifold air is let into the crankcase 28 or in a positive crankcase ventilation manner where some manifold air is metered into the crankcase 28. The flow of gases from the crankcase through the push-side conduit 74, and into intake passage 12 via push-side port 101 is also referred to herein as push-side PCV flow or PCV push-side flow.

The gases in crankcase 28 may include un-burned fuel, un-combusted air, and fully or partially combusted gases. Further, lubricant mist may also be present. As such, various oil separators may be incorporated in positive PCV system 16 to reduce exiting of the oil mist while allowing exiting of fuel vapor from the crankcase 28 through the PCV system 16. For example, conduit 76 may include a uni-directional oil separator 82 which filters oil from vapors exiting crankcase 28 before they re-enter the intake manifold 42. Another oil separator 81 may be disposed in crankcase ventilation tube 74 to remove oil from the stream of gases exiting the crankcases during boosted operation. Additionally, in some embodiments, conduit 76 may also include a vacuum sensor 84 coupled to the PCV system 16.

Exhaust combustion gases exit the combustion chamber 34 via exhaust passage 60 located upstream of turbine 62. An exhaust gas sensor 64 may be disposed along exhaust passage 60 upstream of turbine 62. Turbine 62 may be equipped with a wastegate bypassing it (not shown), and turbine 62 may be driven by the flow of exhaust gases passing there through. Furthermore, turbine 62 may be mechanically coupled to compressor 50 via a common shaft (not shown), such that rotation of turbine 62 may drive compressor 50. Sensor 64 may be a suitable sensor for providing an indication of engine air-to-fuel ratio from exhaust gas constituents. For example, sensor 64 may be a linear oxygen sensor or UEGO (universal or wide-range exhaust gas oxygen), a two-state oxygen sensor or EGO, a HEGO (heated EGO), a NOx, HC, or CO sensor. Exhaust gas sensor 64 may be in electrical communication with controller 166. As discussed herein, the engine air-to-fuel ratio may be utilized to estimate an oil dilution amount.

All or part of the treated exhaust from emission control device 69 may be released into the atmosphere via exhaust conduit 70. Depending on operating conditions, however, some exhaust may be diverted instead to EGR passage 51, through EGR cooler 47 and EGR valve 49, to the inlet of compressor 50. In this manner, the compressor is configured to admit exhaust tapped from downstream of turbine 62. The EGR valve may be opened to admit a controlled amount of cooled exhaust gas to the compressor inlet for desirable combustion and emissions-control performance. In this way, engine system 100 is adapted to provide external, low-pressure (LP) EGR. The rotation of the compressor, in addition to the relatively long LP EGR flow path in engine system 100, provides excellent homogenization of the exhaust gas into the intake air charge. Further, the disposition of EGR take-off and mixing points provides effective cooling of the exhaust gas for increased available EGR mass and improved performance.

In some examples, EGR system 18 may further include a differential pressure over valve (DPOV) sensor (not pictured). In one example, an EGR flow rate may be estimated based on the DPOV system which includes the DPOV sensor that detects a pressure difference between an upstream region of the EGR valve 49 and a downstream region of EGR valve 49. This EGR flow rate may be used in part to determine the contribution of EGR gases to measurements of intake air oxygen content as measured by IAO2 sensor 88.

Fuel system 19 may include a fuel tank 128 coupled to a fuel pump system 202. The fuel pump system 202 may include one or more pumps for pressurizing fuel delivered to the injectors of engine 111, such as the example direct fuel injector 220 shown. While only a single fuel injector 220 is shown, additional fuel injectors may be provided for each cylinder, for instance port fuel injector 221 at FIG. 2. It will be appreciated that fuel system 19 may be a return-less fuel system, a return fuel system, or various other types of fuel system. Vapors generated in fuel system 19 may be routed to a fuel vapor canister 104, described further below, via conduit 135, before being purged via fuel vapor purging system 17. Conduit 135 may optionally include a fuel tank isolation valve. Among other functions, fuel tank isolation valve may allow the fuel vapor canister 104 to be maintained at a low pressure or vacuum without increasing the fuel evaporation rate from the tank (which would otherwise occur if the fuel tank pressure were lowered). The fuel tank 128 may hold a plurality of fuel blends, including fuel with a range of alcohol concentrations, such as various gasoline-ethanol blends, including E10, E85, gasoline, etc., and combinations thereof.

Fuel vapor canister 104 may be filled with an appropriate adsorbent and configured to temporarily trap fuel vapors (including vaporized hydrocarbons) during fuel tank refilling operations and "running loss" (that is, fuel vaporized during vehicle operation). In one example, the adsorbent used is activated charcoal. Fuel vapor canister 104 may further include a vent 136 which may route gases out of the canister 104 to the atmosphere when storing, or trapping, fuel vapors from fuel system 19. Vent 136 may also allow fresh air to be drawn into fuel vapor canister 104 when purging stored fuel vapors from fuel system 19 to intake 12 via fuel vapor purging system 17. While this example shows vent 136 communicating with fresh, unheated air, various modifications may also be used. Flow of air and vapors between fuel vapor canister 104 and the atmosphere may be regulated by the operation of a canister vent solenoid (not shown), coupled to canister vent valve 172.

Fuel vapor canister 104 operates to store vaporized hydrocarbons (HCs) from fuel system 19. Under some operating conditions, such as during refueling, fuel vapors present in the fuel tank may be displaced when liquid is added to the tank. The displaced air and/or fuel vapors may be routed from the fuel tank 128 to the fuel vapor canister 104, and then to the atmosphere through vent 136. In this way, an increased amount of vaporized HCs may be stored in fuel vapor canister 104.

During a later engine operation, the stored vapors may be released back into the incoming air charge via fuel vapor purging system 17. Fuel vapor purging system 17 includes ejector 140, which includes a housing 168. One or more check valves may be arranged within housing 168. Further, ejector 140 includes a first port 142, a second port 144, and a third port 146. In one example, only these three ports are included. Duct 148 couples first port 142 of ejector 140 to intake passage 12 downstream of each of compressor 50 and throttle 44. Duct 150 couples second port 144 of ejector 140 to fuel vapor canister 104. Duct 152 couples third port 146 of ejector 140 to intake passage 12 upstream of compressor 50 (i.e., at an upstream inlet of the compressor). Duct 152 may be coupled to intake passage 12 downstream of an air filter 54. A CPV 158 is arranged in duct 150, to regulate the flow of vapors from fuel vapor canister 104 to ejector 140. Optionally, a third check valve 170 may be included in duct 148 intermediate the ejector and the intake passage. The ejector is designed such that during boost conditions, a low pressure zone is created in the ejector which draws fuel vapors from the CPV to the upstream inlet of the compressor. Under vacuum conditions, for example when intake manifold vacuum is present, fuel vapors are drawn from the CPV, through the ejector, to the intake manifold.

It should be appreciated that fuel vapor canister 104 is not coupled directly to intake passage 12 or intake manifold 42. Rather, the canister is coupled to ejector 140 via duct 150, and ejector 140 is coupled to intake passage 12 upstream of compressor 50 via duct 152 and to intake passage 12 downstream of throttle 44 via duct 148. Further, it should be appreciated that fuel vapor canister 104 is coupled (via duct 150 and ejector 140) to intake passage 12 downstream of the throttle, and not upstream of the throttle. In this way, vapor flow from fuel vapor canister 104 passes through second port 144 of ejector 140 before continuing on to the intake passage via third port 146 or first port 142 of the ejector, depending on whether boost or vacuum conditions are present.

The vehicle system 100 may further include control system 160. Control system 160 is shown receiving information from a plurality of sensors 162 and sending control signals to a plurality of actuators 164. Sensors 162 may include pressure, temperature, air/fuel ratio, and composition sensors, for example. Actuators 164 may include fuel injector 132, CPV 158, throttle 44, and a grille shutter actuator (not shown), for example. The control system 160 may include a controller 166. The controller may receive input data from various sensors, process the input data, and trigger various actuators in response to the processed input data based on instruction or code programmed therein corresponding to one or more routines. For example, as detailed below with respect to FIG. 3, the controller may determine a desired angle of inclination for grille shutters 114 based on engine operating conditions.

Turning now to FIG. 2, it shows a direct injection fuel system 200 coupled to an internal combustion engine 210, which may be configured as a propulsion system for a vehicle. The internal combustion engine 210 may comprise multiple combustion chambers or cylinders 34. LPG fuel can be provided directly to the cylinders 34 via in-cylinder direct injectors 220. As indicated schematically in FIG. 2, the engine 210 can receive intake air and it can exhaust products of the combusted fuel and air.

Fuel can be provided to the engine 210 via the injectors 220 by way of a fuel pump system indicated generally at 202. In this particular example, the fuel pump system 202 includes a fuel storage tank 128 for storing the fuel on-board the vehicle, a lower pressure fuel pump 230 (e.g., a fuel lift pump), a higher pressure fuel pump or direct injection fuel pump 240, a fuel rail 258, and various fuel passages 254, 255, and 256. In the example shown in FIG. 2, the fuel passage 254 carries fuel from the lower pressure pump 230 to the fuel filter 206. Fuel passage 255 carries fuel from fuel filter 206 to fuel cooling chamber 237 before fuel reaches direct injection fuel pump 240. Fuel passage 256 carries fuel from the fuel injection pump 240 to the fuel rail 258.

Fuel cooling chamber 237 includes a fuel injector 223 that is supplied fuel from fuel passage 255. Fuel injector 223 may inject fuel into fuel cooling chamber 237 where the pressurized fuel expands to vapor and cools liquid fuel flowing into direct injection fuel pump 240. Expanded fuel may be injected to engine 210 via a port fuel injector 221 which injects vaporized fuel into the engine intake manifold or cylinder intake runners. Alternatively, expanded fuel may exit fuel cooling chamber 237 and be returned to fuel tank 252 via passage 233. Fuel injector 223 is opened and closed via a pulse width modulated voltage supplied by controller 270. This gaseous fuel may also be routed to the fuel vapor purge system which is in place for the gasoline fuel system, if the vehicle is equipped with an auxiliary gasoline system.

Fuel rail 258 may distribute fuel to each of a plurality of fuel injectors 220. Each of the plurality of fuel injectors 220 may be positioned in a corresponding cylinder 34 of engine 210 such that during operation of fuel injectors 220 fuel is injected directly into each corresponding cylinder 34. Alternatively (or in addition), engine 210 may include fuel injectors positioned at the intake port of each cylinder such that during operation of the fuel injectors fuel is injected in to the intake port of each cylinder. In the illustrated example, engine 210 includes four cylinders. However, it will be appreciated that the engine may include a different number of cylinders.

The lower pressure fuel pump 230 can be operated by a controller 270 to provide fuel to fuel injection pump 240 via fuel passage 254. The lower pressure fuel pump 230 can be configured as what may be referred to as a fuel lift pump. As one example, lower pressure fuel pump 230 can include an electric pump motor, whereby the pressure increase across the pump and/or the volumetric flow rate through the pump may be controlled by varying the electrical power provided to the pump motor, thereby increasing or decreasing the motor speed. For example, as the controller 270 reduces the electrical power that is provided to pump 230, the volumetric flow rate and/or pressure increase across the pump 230 may be reduced. The volumetric flow rate and/or pressure increase across the pump may be increased by increasing the electrical power that is provided to the pump 230. As one example, the electrical power supplied to the lower pressure pump motor can be obtained from an alternator or other energy storage device on-board the vehicle (not shown), whereby the control system can control the electrical load that is used to power the lower pressure pump 230. Thus, by varying the voltage and/or current provided to the lower pressure fuel pump 230 via conductor 282, the flow rate and pressure of the fuel provided to fuel injection pump 240 and ultimately to the fuel rail may be adjusted by the controller 270.

Low-pressure fuel pump 230 may be in fluid communication with check valve 204 to facilitate fuel delivery, prevent fuel backflow, and maintain fuel line pressure. In particular, check valve 204 includes a ball and spring mechanism that seats and seals at a specified pressure differential to deliver fuel downstream of check valve 204. In some examples, fuel system 250 may include a series of check valves in fluid communication with low-pressure fuel pump 230 to further impede fuel from leaking back upstream of the valves. Check valve 204 is in fluid communication with fuel filter 206. Fuel filter 206 may remove small impurities that may be contained in the fuel that could potentially restrict fuel flow. Fuel may be delivered from filter 206 to fuel injector 223 and high-pressure fuel pump (e.g., fuel injection pump) 240. Fuel injection pump 240 may increase the pressure of fuel received from the fuel filter from a first pressure level generated by low-pressure fuel pump 230 to a second pressure level higher than the first level. Fuel injection pump 240 may deliver high pressure fuel to fuel rail 258 via fuel line 256. Operation of direct injection fuel pump 240 may be adjusted based on operating conditions of the vehicle in order to reduce noise/vibration/harshness (NVH) which may be perceived positively by a vehicle operator.

The direct injection fuel pump 240 can be controlled by the controller 270 to provide fuel to the fuel rail 258 via the fuel passage 256. As one non-limiting example, fuel injection pump 240 may utilize a flow control valve, a solenoid actuated "spill valve" (SV) or fuel volume regulator (FVR), indicated at 242 to enable the control system to vary the effective pump volume of each pump stroke. The fuel injection pump 240 may be mechanically driven by the engine 210 in contrast to the motor driven lower pressure fuel pump or fuel lift pump 230. A pump piston 244 of the direct injection fuel pump 240 can receive a mechanical input from the engine crank shaft or cam shaft via a cam 246. In this manner, fuel injection pump 240 can be operated according to the principle of a cam-driven single-cylinder pump.

As depicted in FIG. 2, a fuel sensor 248 is disposed in passage 254 downstream of the fuel lift pump 230. The fuel sensor 248 may measure fuel composition and may operate based on fuel capacitance, or the number of moles of a dielectric fluid within its sensing volume. For example, an amount of ethanol (e.g., liquid ethanol) in the fuel may be determined (e.g., when a fuel alcohol blend is utilized) based on the capacitance of the fuel. The fuel sensor 248 may be used to determine a level of vaporization of the fuel, as fuel vapor has a smaller number of moles within the sensing volume than liquid fuel. As such, fuel vaporization may be indicated when the fuel capacitance drops off. As described in greater detail with reference to FIGS. 4 and 5, the fuel sensor 248 may be utilized to determine the level of fuel vaporization of the fuel such that the controller 270 may adjust the lift pump output pressure in order to reduce fuel vaporization within the fuel lift pump 230.

Further, in some examples, the direct injection fuel pump 240 may be operated as the fuel sensor 248 to determine the level of fuel vaporization. For example, a piston-cylinder assembly of the fuel injection pump 240 forms a fluid-filled capacitor. As such, the piston-cylinder assembly allows the fuel injection pump 240 to be the capacitive element in the fuel composition sensor. In some examples, the piston-cylinder assembly of the fuel injection pump 240 may be the warmest point in the system, such that fuel vapor forms there first. In such an example, the direct injection fuel pump 240 may be utilized as the sensor for detecting fuel vaporization, as fuel vaporization may occur at the piston-cylinder assembly before it occurs anywhere else in the system.

As shown in FIG. 2, the fuel rail 258 includes a fuel rail pressure sensor 262 for providing an indication of fuel rail pressure to the controller 270. An engine speed sensor 264 can be used to provide an indication of engine speed to the controller 270. The indication of engine speed can be used to identify the speed of fuel injection pump 240, since the pump 240 is mechanically driven by the engine 210, for example, via the crankshaft or camshaft. An exhaust gas sensor 266 can be used to provide an indication of exhaust gas composition to the controller 270. As one example, the gas sensor 266 may include a universal exhaust gas sensor (UEGO). The exhaust gas sensor 266 can be used as feedback by the controller to adjust the amount of fuel that is delivered to the engine via the injectors 220. In this way, the controller 270 can control the air-fuel ratio delivered to the engine to a desired air-fuel ratio.

Furthermore, controller 270 may receive other engine/exhaust parameter signals from other engine sensors such as engine coolant temperature, engine speed, throttle position, absolute manifold pressure, emission control device temperature, etc. Further still, controller 270 may provide feedback control based on signals received from fuel sensor 248, pressure sensor 262, and engine speed sensor 264, among others. For example, controller 270 may send signals to adjust a current level, current ramp rate, pulse width of a solenoid valve (SV) 242 of fuel injection pump 240, and the like to adjust operation of fuel injection pump 240, a fuel pressure set-point of fuel pressure regulator, and/or a fuel injection amount and/or timing based on signals from fuel sensor 248, pressure sensor 262, engine speed sensor 264, and the like.

The controller 270 can individually actuate each of the injectors 220 and injector 223. The controller 270 and other suitable engine system controllers can comprise a control system. The controller 270, in this particular example, includes an electronic control unit comprising one or more of an input/output device 272, a central processing unit (CPU) 274, read-only memory (ROM) 276 or non-transitory memory, random-accessible memory (RAM) 277, and keep-alive memory (KAM) 278. The storage medium ROM 276 can be programmed with computer readable data representing non-transitory instructions executable by the processor 274 for performing the methods described below as well as other variants that are anticipated but not specifically listed.

As shown, direct injection fuel system 200 is a returnless fuel system, and may be a mechanical returnless fuel system (MRFS) or an electronic returnless fuel system (ERFS). In the case of an MRFS, the fuel rail pressure may be controlled via a pressure regulator (not shown) positioned at the fuel tank 128. In an ERFS, a pressure sensor 262 may be mounted at the fuel rail 258 to measure the fuel rail pressure relative to the manifold pressure. The signal from the pressure sensor 262 may be fed back to the controller 270 which modulates the voltage to the fuel injection pump 240 for supplying the desired fuel pressure and fuel flow rate to the injectors.

Although not shown in FIG. 2, in other examples, direct injection fuel system 200 may include a return line whereby excess fuel from the engine is returned via a fuel pressure regulator to the fuel tank via a return line. A fuel pressure regulator may be coupled in line with a return line to regulate fuel delivered to fuel rail 258 at a desired pressure. To regulate the fuel pressure at the desired level, the fuel pressure regulator may return excess fuel to fuel tank 128 via the return line. It will be appreciated that operation of fuel pressure regulator may be adjusted to change the desired fuel pressure to accommodate operating conditions.

FIG. 3 provides an example routine 300 for determining a desired grille shutter opening (e.g., the opening of grille shutters 114 at FIG. 1) based on various engine operating conditions and commanding an adjustment of the grille shutter opening to a commanded position, the commanded position determined based on the desired position. In this way, an engine front-end airflow may be adjusted. In some examples, the desired and commanded grille shutter positions may be restricted to be one of fully open or fully closed. However in other examples, the desired and commanded grille shutter positions may further a mid-point position between fully open and fully closed.

The commanded position may differ from the desired position in instances where multiple engine conditions which correspond to differing desired positions are present. For instance, a first engine condition may be present which corresponds to a fully closed position, while a second engine condition may be present which corresponds to a fully open grille shutter position. In this example, the commanded position may be an intermediate position between fully closed and fully open. In the depicted embodiment, desired and commanded grille shutter positions are determined based on each of engine coolant temperature and vehicle acceleration, then selectively adjusted further based on an estimated fuel-in-oil dilution level.

Routine 300 beings by estimating and/or measuring engine operating conditions. Engine operating conditions may include engine speed and load, vehicle speed, pedal position, conditions of the CAC (CAC temperature and pressure), CAC efficiency, engine temperatures, ECT, feedback grille shutter position, etc. At 304, the method includes determining if ECT is greater than an upper threshold temperature. The threshold temperature may be based on an ECT indicating a need for increased cooling of the radiator and additional engine components. If the ECT is not greater than the upper threshold temperature, routine 300 continues to 306.

Alternatively at 304, if ECT is greater than the threshold temperature, routine 300 continues to 308 where the controller determines the desired and corresponding commanded grille shutter position based on ECT and independent of additional engine operation conditions. In the depicted example, determining the desired and commanded positions based only on ECT includes choosing the desired and commanded positions to be fully open responsive to ECT above the upper threshold temperature. In an alternate embodiment, the desired and commanded positions may be chosen to be open mid-point positions more open than the current grille shutter position, thereby increasing engine front-end airflow. In this way, engine front-end airflow may be increased in response to coolant temperature above the upper threshold temperature, thereby providing more ventilation to the engine compartment and reducing engine temperatures.

In further example, at 308, the desired grille shutter position may be a function of ECT only and the corresponding commanded grille shutter position may be based on the desired grille shutter position and vehicle speed. In a further example, the desired and/or commanded grille shutter position may a function of ECT starting from a base percentage opening. The base percentage opening may be a partially open position. As one example, the base percentage opening may be 10%. In another example, the base percentage opening may be greater than 0% and smaller or greater than 10%. In this way, the controller may open the grille shutters to at least the base opening when the ECT is greater than the threshold.

Continuing at 306, the controller may determine whether vehicle acceleration was detected at 302. In one example, the acceleration event may be detected via a pedal position signal from a pedal position sensor (e.g., pedal position sensor 134 at FIG. 1) or in another example via an accelerometer. If vehicle acceleration is detected, and the engine coolant temperature is not above an upper threshold temperature (note this second condition was confirmed at 304), routine 300 proceeds to 310. At 310 the desired and commanded positions are chosen as fully closed. In an alternate embodiment, the desired and commanded positions may be chosen as closed mid-point positions more closed than the current grille shutter position, thereby decreasing front-end engine airflow. In this way, if coolant temperature does not indicate overheating, fuel economy may be improved during vehicle acceleration via improved aerodynamics. After choosing the commanded position as fully closed, routine 300 proceeds to 318.

At 312, the controller may determine the desired and corresponding commanded grille shutter position based on ECT and additional engine operation conditions not including oil dilution. The additional engine operating conditions may include one or more of driving conditions, deceleration, CAC efficiency, CAC condensation level, vehicle speed, etc. The desired grille shutter position may be fully open in response to a deceleration event. The desired and commanded grille shutter position may be fully closed in response to engine coolant temperature below a lower threshold temperature.

In some examples, determining desired and commanded grille shutter positions may be based only on engine coolant temperature. In other examples, determining desired and commanded grille shutter positions may be based on each of engine coolant temperature and vehicle acceleration/deceleration. Further, during conditions where neither of vehicle acceleration or deceleration is present, determining the desired and commanded grille shutter positions based on engine coolant temperature and vehicle acceleration/deceleration at 312 may comprise determining the desired and commanded grille shutter positions based only on engine coolant temperature. In a further example, determining the commanded position at 312 may be based on a weighted average of desired positions associated with various engine operating conditions.

At 314, an amount of fuel diluted in the crankcase oil supply (e.g., fuel diluted in oil sump 32 at FIG. 1), herein also referred to as an oil dilution amount and as a fuel in oil dilution level, is estimated. In one example, the fuel in oil dilution level may be estimated via routine 400 at FIG. 4. Therein, as described in further detail below, one of an oil dilution model and a PCV fuel compensation strategy may be used to estimate an oil dilution amount. At 315, the estimated oil dilution amount may be compared to a threshold dilution amount and the desired grille shutter position may be selectively adjusted based on this comparison. In one example, the threshold may be based on a number of cold start operations without warm-up, the estimated dilution, and an estimated hot cycle dilution at shutdown. In another example, the threshold may be determined based on the temperature of the oil at the last engine shut down command, which may provide an indication of the amount of accumulated fuel accumulated in previous vehicle trips.

At 316, a decision is made based on the comparison made at 315. Specifically, if the fuel in oil dilution level is below the threshold dilution level, routine 300 proceeds directly to 320 to adjust the grille shutter to the commanded position as determined at 312 independent of an estimated fuel in oil dilution level. Alternatively, if the oil dilution level is above the threshold level, the desired grille shutter position may be adjusted from the position determined at 312 to a commanded position further based on estimated fuel in oil dilution level. In one example, the commanded position may be adjusted based on a desired grille shutter position corresponding to the estimated oil dilution amount. In another example, the commanded position may be adjusted to be the desired position corresponding to the estimated oil dilution amount. Adjusting the commanded grille shutter opening based on the estimated oil dilution amount may be performed via one of routines 600 and 700 and is discussed with further detail with reference to FIGS. 6-7. After further adjusting the commanded grille shutter position based on an estimated oil dilution amount at 318, routine 300 proceeds to 320 to adjust the grille shutter to the commanded position.

At 320, routine 300 adjusts the grille shutter to the commanded grille shutter position, for example via a grille shutter actuator. In one example, adjusting the grille shutter opening includes adjusting an angle of opening from a first mid-point position to a second, different, mid-point position. Adjusting the grille shutter to the commanded position may include adjusting the grille shutter to the commanded position and maintaining the grille shutter at the commanded position or a specified duration, the duration determined based on an estimated rate of temperature increase for at one or more of engine oil and engine coolant. Adjusting the grille shutter to the commanded position may also be based on feedback from a grille shutter position sensor (e.g., sensor 118 at FIG. 1). As non-limiting examples, the commanded position may have been determined based on ECT independent of other engine operating conditions (e.g., at 308), based on a DFSO event (e.g., at 310), based on ECT and other engine operating conditions (e.g., at 312), or based on an estimated oil in fuel dilution level in addition to ECT and other engine operating conditions (e.g., at 318).

If the current grille shutter position is a position more open than the commanded grille shutter position, adjusting the grille shutter position at 320 may include decreasing the grille shutter opening by a specified amount (e.g., adjusting the opening by a specified percentage or degree of inclination). Decreasing the grille shutter opening may include adjusting the grille shutter opening from a first open position to a second open position, the first open position a more open position than the second. As another example, decreasing the grille shutter opening may include adjusting the grille shutter opening from an open position to a closed position. In a still further example, decreasing the grille shutter opening may include adjusting the grille shutter opening from a first closed position to a second closed position, the second closed position more closed than the first. In this way, by decreasing a grille shutter opening, temperatures within the engine compartment may increase and promote fuel vaporization, thereby decreasing fuel in oil dilution.

As an alternate example, if the current grille shutter position is a position less open than the commanded grille shutter position, adjusting the grille shutter position at 320 may include increasing the grille shutter opening by a specified amount (e.g., adjusting the opening by a specified percentage or degree of inclination). Increasing the grille shutter opening may include adjusting the grille shutter opening from a first open position to a second open position, the second open position a more open position than the second. As another example, increasing the grille shutter opening may include adjusting the grille shutter opening from a closed position to an open position. In a still further example, increasing the grille shutter opening may include adjusting the grille shutter opening from a first closed position to a second closed position, the first closed position more closed than the first. In this way, by adjusting the grille shutters to a more open position adequate ventilation of the engine during an acceleration event may be provided.

In this way, by selectively adjusting a grille shutter opening responsive to fuel in oil dilution, and adjusting a grille shutter opening further based on one more of an engine coolant temperature, charge air cooler temperature, and acceleration/deceleration, fuel in oil dilution may be addressed while providing a desired amount of control over engine temperatures and fuel efficiency.

In some examples, 320 may also include adjusting one or more other engine operating conditions to reduce oil dilution. Such adjustments include but are not limited to advancing a fuel injection timing, increasing a fuel pressure, and performing a split fuel injection under various conditions. In this way, engine operating parameters may be adjusted based on the oil dilution amount to reduce oil dilution and improve emissions. Routine 300 then terminates.

As discussed herein, oil may be diluted with fuel during engine operation. For example, oil dilution with fuel may increase when engine operating temperatures are below an evaporative threshold. Oil dilution may be monitored based on an ambient temperature, an engine block temperature, an engine coolant temperature, an engine speed, an engine load, a fuel injection pressure, a fuel injection timing, an engine operation time, a commanded air-to-fuel ratio, and an engine air-to-fuel ratio as described with respect to FIG. 4, and based on the oil dilution amount, engine operating parameters such as fuel injection timing may be adjusted to reduce oil dilution. During some conditions, oil dilution may be further monitored based on measurements from an intake air oxygen sensor (e.g., IAO2 sensor 88 at FIG. 1) of PCV gases via a PCV fuel compensation strategy, as further elaborated with respect to FIG. 5. In one example, the PCV fuel compensation strategy includes estimating a hydrocarbon content of the intake air, and may be selectively performed when both of EGR and fuel vapor purge are not operating. The adjustment of grille shutters based on oil dilution will be further elaborated with respect to FIGS. 4-6.

Figure 4:
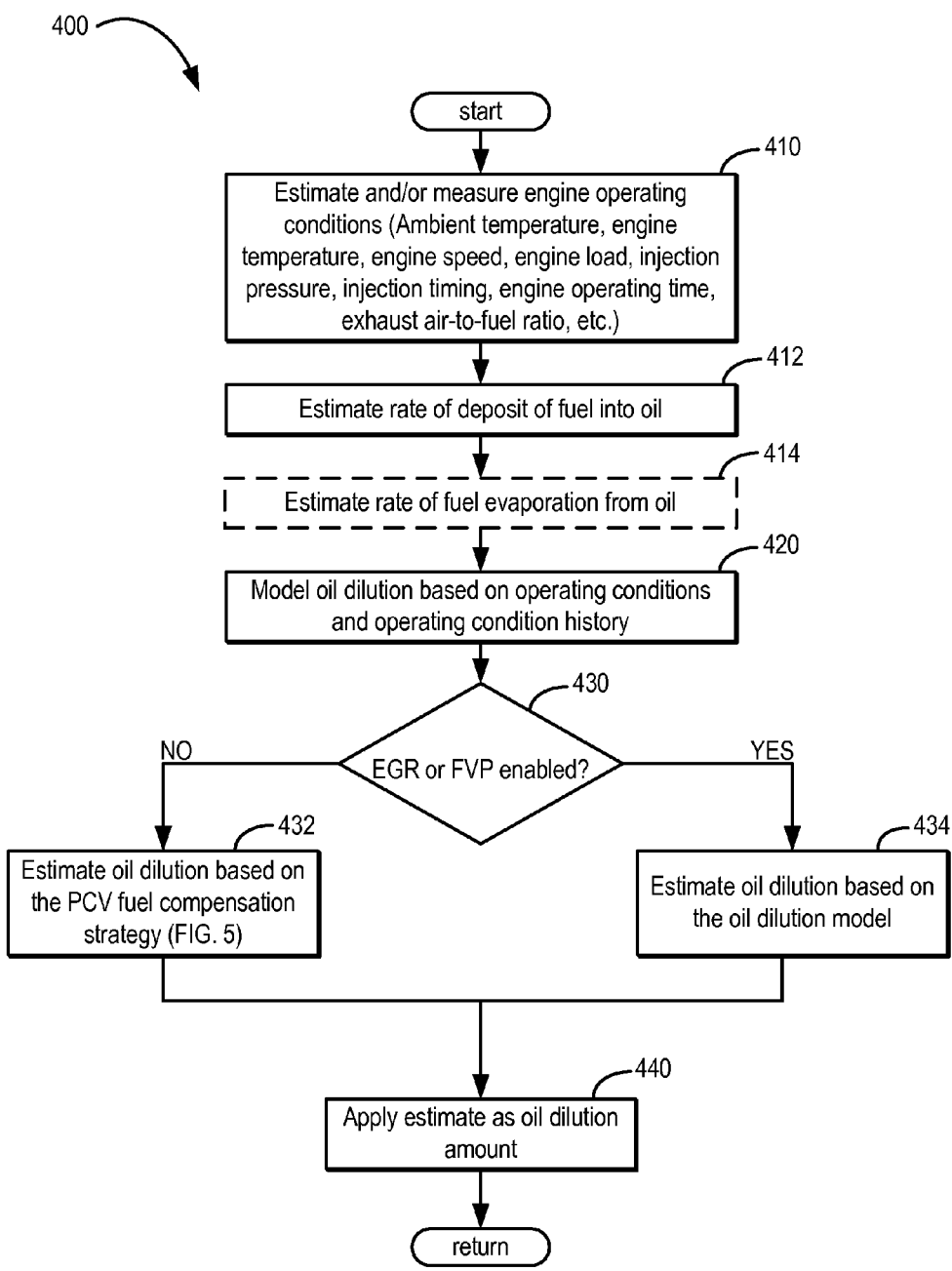
FIG. 4 depicts a flowchart for estimating an amount of oil dilution based on one of a PCV fuel compensation strategy and an oil dilution mode.

Turning now to FIG. 4, it shows an example routine 400 which depicts a method for estimating an oil dilution amount. In one example routine 400 is executed as part of a routine for adjusting engine operating conditions including a grille shutter opening based on the estimated oil dilution amount (e.g., at 314 in routine 300). The oil dilution amount is estimated based on one or each of two methods, namely an oil dilution model and/or a PCV fuel compensation strategy, the particular method used determined based on engine operating conditions. In the depicted example, the PCV fuel compensation strategy is used to estimate the oil dilution amount when push-side PCV flow is present and both of EGR and fuel vapor purge are disabled, while the oil dilution model may otherwise be used to estimate the oil dilution amount. As a specific example, if EGR and fuel vapor purge are disabled but push-side PCV is not present (e.g., if boost conditions are not present, thereby disallowing push-side PCV flow), an oil dilution model is used to estimate the oil dilution amount. In an alternate example, the estimated oil dilution amount may be based on the oil dilution model during all conditions, and the estimate may be further based on PCV fuel compensation strategy when push-side PCV flow is present and both of EGR and FVP are disabled. In alternate examples where EGR system 18 further includes a DPOV sensor, oil dilution may be estimated based on a PCV fuel compensation strategy when the push-side PCV flow is present, EGR is enabled, and FVP is disabled.

In the depicted example, the engine system of the vehicle executing routine 400 includes each of a PCV system, an EGR system, and an FVP system (e.g., motor vehicle 102 at FIG. 1). However, in alternate examples, routine 400 may be executed by a vehicle with a PCV system but without EGR or FVP, in which case a PCV compensation strategy may be used to estimate an oil dilution level when push-side PCV flow is present.

Adjusting engine operating conditions in response to the estimated oil dilution amount may include further closing the grille shutters under certain conditions. For example, in response to the estimated oil dilution amount being greater than a threshold level, a grille shutter position may be adjusted to a position that is more closed than the current grille shutter position. In this way, engine temperatures may be increased to vaporize more fuel in the oil, thereby reducing the dilution of oil. In response to the estimated oil dilution amount being less than the threshold amount, oil in fuel dilution level may not be used to adjust the grille shutter position.

At 410, routine 400 may include estimating and/or measuring one or more engine operating conditions. Engine operating conditions may include an ambient temperature, an engine temperature, an engine speed, an engine load, an injection pressure, an injection timing, a duration of engine operation, an engine air-to-fuel ratio, etc. Upon determining the engine operating conditions, the routine may proceed to 412.

At 412, an estimated rate of deposit of fuel into oil is estimated based on injection pressure, injection spray angle, start of injection (SOI), and inducted air charge temperature. At 414, if engine temperatures are above a lower threshold temperature, an estimated rate of vaporization may be determined based on an assumption of the fuel species that accumulate in the oil and the vapor pressures of these species. Assuming the fuel species that accumulate in the oil may include assuming a class of hydrocarbons present in the fuel provided to the direct injector. In one example, the lower threshold temperature may be a fuel vaporization temperature determined based on properties of the fuel and oil in the engine system.

At 420, the routine may include determining an oil dilution model based on the engine operating conditions. In one example, the oil dilution model may be based on a difference between a commanded air-to-fuel ratio and an engine air-to-fuel ratio as determined from an exhaust sensor. The commanded air-to-fuel ratio may be determined based on an amount of fuel injection determined by the engine controller to maintain the exhaust gas products at stoichiometric conditions. The engine air-to-fuel ratio may be determined based on a reading from the exhaust UEGO sensor (e.g., sensor 64 at FIG. 1).

For example, during cold start conditions, when it is determined that the controller is commanding more fuel to maintain the engine air-to-fuel ratio at stoichiometry, it may be inferred that the fuel is lost to the oil pan by passing the piston rings. Accordingly, when the commanded air-to-fuel ratio is richer than stoichiometry and the exhaust sensor based engine air-to-fuel ratio is at stoichiometry, an oil dilution amount may be increased. The amount of increase may be based on the integrated difference between the commanded air-to-fuel ratio and the engine air-to-fuel ratio as determined via the exhaust oxygen sensor. Likewise, when the controller is commanding less fuel to maintain the engine air-to-fuel ratio at stoichiometry, it may be inferred that excess fuel (to maintain stoichiometric engine air-to-fuel ratio) may come from the PCV system. Accordingly, the oil dilution amount may be decreased. The amount of decrease may be based on the integrated difference between the commanded air-to-fuel ratio and the engine air-to-fuel ratio.

In another example, the oil dilution model may be based on a duration of engine operation and a fuel injection timing. For example, during engine operation in a warm state (e.g. engine temperature may be at or greater than a threshold temperature, catalyst may be at or greater than a catalyst light-off temperature, etc.), the controller may determine if late fuel injection was carried out at one or more cylinders since engine start. As such, late fuel injections may be performed during a cold start condition to improve particulate emissions. In other words, the start of fuel injection timing during cold start operations may be retarded from start of fuel injection timings when engine is not operating in cold start conditions. However, late fuel injection may increase dilution of oil in the crankcase. Therefore, if late fuel injection was performed since engine start, the controller may determine if a duration of engine operation in the warm state is greater than a threshold duration. The threshold duration may be based on an amount of fuel that was injected late since engine stop. For example, it may take a duration of time with engine operating in warm conditions after cold-start to combust the excess fuel in the PCV system (excess fuel in the PCV system may be due to late fuel injection timings utilized during the cold start to reduce particulate matter and particle number emissions). Therefore, if the duration of engine operation in the warm state is greater than the threshold duration, excess fuel in the PCV system may be combusted. Consequently, the oil dilution amount may be reduced. However, if it is determined that the duration of engine operation is not greater than the threshold duration, excess fuel in the PCV system may not be combusted. As a result, oil dilution amount may not be decreased.

As such, an amount by which the oil dilution amount may be increased or decreased when engine is not operating in cold start conditions may be based on a duration of engine operation in the warm state, and an amount of fuel injected with late fuel injection. For example, the amount of increase of oil dilution amount may increase as the duration of engine operation in the warm state decreases. Further, the amount of increase of oil dilution amount may increase with an increase in the amount of fuel injected late. Similarly, the amount of decrease of oil dilution amount may increase as the duration of engine operation in the warm state increases, and as the amount of fuel injected late decreases.

In a still further example, the oil in fuel dilution model may be based on current vehicle data as well as past data, including but not limited to engine temperature history and ambient temperature history. In further examples, including the above example, the oil in fuel dilution model may estimate a dilution level based on past dilution level estimates in addition to an estimated rate of deposit of fuel into oil and an estimated rate of vaporization of fuel from oil. Specifically, a difference in an estimated rate of deposit and an estimated rate of vaporization of fuel from oil may be determined, and this rate may be applied to a previous estimate for oil in fuel dilution (e.g., via an integral) to determine a current oil in fuel dilution estimate.

Continuing at 430, a decision is made based on whether the EGR and fuel vapor purge systems in the vehicle are enabled or disabled. In one example, EGR may be enabled based on engine speed-load conditions where EGR benefits can be achieved. For example, EGR may be enabled when engine speed is above a threshold speed (e.g., above an idle speed) and when engine load is above a threshold load (e.g., above a minimum load). The controller may determine EGR is enabled if an EGR valve is open and EGR is flowing through an EGR passage (e.g., EGR valve 49 and EGR passage 51 shown in FIG. 1). In the presence of recirculated exhaust gas, a controller may not be able to distinguish the effect on EGR hydrocarbons on the oxygen sensor relative to those of PCV hydrocarbons. Therefore estimating a fuel in oil dilution level while EGR is enabled may degrade the accuracy of such estimates. As used herein, the EGR refers to a low pressure EGR recirculated from an exhaust manifold, downstream of a turbine, to an intake manifold, upstream of a compressor.

In one example, a fuel vapor canister (such as fuel vapor canister 104 shown in FIG. 1) may be purged when a canister load is higher than a threshold, the engine is running, and a purge valve is open. As such, if purge air is received in the intake aircharge, purge hydrocarbons (HCs) may be ingested along with exhaust residuals in the EGR. In the presence of purge air, a controller may not be able to distinguish the effect on purge hydrocarbons on the oxygen sensor relative to those of PCV hydrocarbons. Therefore estimating a fuel in oil dilution level while purge is enabled may degrade the accuracy of such estimates.

Thus, if one of EGR and purge are enabled at 430, the method continues on to 434 to estimate the oil dilution amount via the oil dilution model introduced above. In an alternate embodiment, the method may close the purge valve and the EGR valve to permit the use of the PCV fuel compensation strategy for estimating an oil dilution amount. In other words, the PCV fuel compensation strategy is only performed to estimate an oil dilution amount if there is no other reductant contribution from EGR or purge air in the intake passage. If both EGR and purge are disabled, routine 400 instead proceeds to 432 to estimate an oil dilution amount via the PCV fuel compensation strategy.

In an alternate example, oil dilution estimates may be made only via the PCV fuel compensation strategy, and thus only based on intake oxygen sensor measurements. In such an example, the grille shutters may not be adjusted based on an oil dilution amount if conditions do not allow for the execution of the PCV fuel compensation strategy. Thus, a method for adjusting a grille shutter opening responsive to fuel in oil dilution (e.g., routine 300 at FIG. 3) may be performed when push-side PCV flow is active, and not performed when push-side PCV flow is inactive. Further, as described herein, the adjusting may not be performed when one of an EGR valve and an FVP valve are open. Put another way, the adjusting may not be performed when one of an EGR system and an FVP system are enabled, but may be performed when both systems are disabled.

Continuing at 432, a PCV fuel compensation strategy may be used to estimate a fuel in oil dilution amount based on one or more of a PCV flow rate, various engine temperature, and an inferred hydrocarbon content of intake gas, the inferred hydrocarbon content based on intake oxygen sensor measurements (e.g., IAO2 sensor 88 at FIG. 1). An example PCV fuel compensation strategy is shown by routine 500 at FIG. 5, and is described in further detail therein.

Alternatively, at 434, an oil dilution amount may be estimated based on the oil dilution model. For example, the oil dilution model may be applied to an oil quality monitor to obtain an estimated oil dilution amount.

In one example, when it is determined that the controller is commanding more fuel to obtain a stoichiometric engine air-to-fuel ratio, the oil quality monitor maintaining a current oil dilution amount may be adjusted by incrementing the oil dilution amount. The amount of increase may be based on the difference between the commanded air-to-fuel ratio and the engine air-to-fuel ratio. As the difference between the commanded air-to-fuel ratio and the engine air-to-fuel ratio increases, the amount of increase of oil dilution amount may increase.

In another example, when it is determined that the controller is commanding less fuel to maintain the engine air-to-fuel ratio at stoichiometry, the oil quality monitor maintaining a current oil dilution amount may be adjusted by decreasing the oil dilution amount.

In still another example, when the commanded air-to-fuel ratio and the engine air-to-fuel ratio are at stoichiometry, it may be inferred that there is no fuel in the oil. That is, oil dilution may be zero.

In yet another example, during a vehicle cold start, a cold start oil dilution quality score may be generated based on the modeled oil dilution. Subsequently, a rolling average of a cold start oil dilution quality score may be determined, and an estimated oil dilution amount may be obtained based on the rolling average.

Upon estimating the oil dilution amount, the routine may proceed to 440. At 440, the estimated amount is applied to memory for use as an oil dilution amount in other routines. For instance the estimated amount may be used in routine 300 (at FIG. 3) to determine whether the oil dilution amount is above or below a threshold amount. The estimated amount may also be applied as a value in one or more oil dilution models, for instance it may be provided as an input for an oil minder or for oil quality monitor logic. Routine 400 then returns to a higher-order routine, or terminates.

FIG. 5 depicts a PCV fuel compensation strategy as detailed by routine 500. In the depicted embodiment, PCV fuel compensation strategy includes determining a hydrocarbon content of the intake air based on an intake air oxygen sensor (e.g. IAO2 sensor 88 at FIG. 1) and converting the HC content estimate to an estimated oil dilution amount, and is executed as part of routine 400 (at 440) for estimating an oil dilution amount.

Routine 500 begins at 502 where it is determined whether both of an EGR system and a fuel vapor purge system are enabled. As mentioned above, the PCV fuel compensation strategy is only used for estimating an oil dilution amount if there is no other reductant contribution from EGR or purge air in the intake passage. In this way, the presence of any hydrocarbons as inferred via a measurement from the IAO2 sensor may be assumed to be from the crankcase via the PCV system, and not from exhaust gas or from fuel tank vapors. In this way, an oil dilution amount may be more accurately estimated via the IAO2 sensor. If one or more of the EGR system and fuel vapor purge system are enabled, routine 500 proceeds to 508 where oil dilution is not estimated via the PCV fuel compensation strategy but instead estimated via the oil dilution model discussed with reference to FIG. 4. After 508, routine 500 returns to 440 at FIG. 4.

At 504, it is determined whether PCV blow-by gases are flowing through the push-side conduit (e.g., conduit 74 at FIG. 1) into the intake air passage (e.g., intake passage 12 at FIG. 1) via push-side port 101. Determining whether push-side PCV gas flow is present may include determining the state of a PCV valve (e.g., PCV valve 78 at FIG. 1) which admits air into the intake passage. For example, it may be determined that push-side flow is present if the PCV valve is closed (thereby preventing pull-side flow) and that push-side flow is not present if the PCV valve is open (i.e., pull-side PCV flow is present rather than push-side PCV flow). In another example, an engine controller may determine that push-side PCV gas flow is present by determining that boosted conditions are present (e.g., if pressure sensor 86 indicates an intake manifold pressure greater than barometric pressure), and may determine that push-side PCV gas flow is not present if boosted conditions are not present. If push-side PCV flow is present, routine 500 proceeds directly to 512 to determine a hydrocarbon content of intake air based on IAO2 measurements. If the PCV gases are not flowing through the push-side flow conduit and into the intake air passage, routine 500 proceeds to 506 to attempt to activate PCV push-side flow.

The controller determines at 506 whether engine conditions allow for the enabling the measurement of PCV gases via the IAO2 sensor. Estimating the oil dilution amount via the PCV fuel compensation strategy requires push-side flow of the PCV system in order to measure the hydrocarbon content of gases in the crankcase. As such the engine must be boosted to provide these gases. As one example, PCV push-side flow may only be present during boosted conditions (e.g., wherein intake air is being boosted by the turbocharger). In this example, if intake air is not being boosted by the turbocharger and conditions do not allow for boosting to begin, PCV push-side flow conditions are not met. In this case, routine 500 proceeds to 508 where oil dilution is not estimated via the PCV fuel compensation strategy but instead estimated via the oil dilution model discussed with reference to FIG. 4. After 508, routine 500 returns to 440 at FIG. 4. If PCV push-side flow is not present but conditions allow for boosting to begin, boost is activated (thereby activating push-side flow) and routine 500 proceeds to 512.

Continuing at 512, the oxygen content at the intake air oxygen sensor and is used to determine a hydrocarbon content of the intake air. As the amount of PCV HCs delivered to the intake passage (upstream of the compressor) increases, such as when PCV push-side flow is present during boosted conditions, the hydrocarbons react with oxygen at the sensing element of the intake oxygen sensor. The oxygen is consumed and water and carbon dioxide is released. As a result, the estimated oxygen concentration is reduced, even though other variables such as intake manifold pressure may remain constant.

Furthermore, the effect of PCV push-side flow on intake oxygen measurements may be learned as a function of boost pressure. As discussed above, PCV push-side flow may be active (e.g., flowing) during all boosted conditions (e.g., wherein intake air is being boosted by the turbocharger) and may be inactive during non-boost conditions. During engine operating conditions when EGR is not enabled (e.g., EGR valve is closed and/or EGR is not flowing) and fuel vapor purge is not enabled (e.g., fuel canister purge valve is closed), the PCV impact on the intake oxygen sensor output may be determined. Specifically, during these conditions, intake oxygen may be measured by the intake oxygen sensor while the engine is not boosted. Then, the controller may turn on boost and again measure the intake oxygen at the intake oxygen sensor. A change in intake oxygen between the non-boosted and boosted conditions may then represent the contribution of PCV flow to the decrease in intake oxygen from a reference point (e.g., zero point). This decrease in intake in oxygen may be attributed to an increase in hydrocarbon content from the PCV gases.

At 514, the HC measurement made at 512 is used to estimate an oil dilution amount. In one example, an expected hydrocarbon content may be determined by relating one or more of a crankcase temperature, crankcase pressure, fuel injection rate, fuel injection mass, the chemical properties of the fuel (e.g., how the specific hydrocarbon content of the fuel may affect the oxygen sensor), and blow-by rate to an expected hydrocarbon content, or vaporized fuel concentration, within the crankcase. The controller may compare the estimated hydrocarbon content from 512 to this expected hydrocarbon content, and determine an oil dilution amount based on the difference. In one example, the model for determining the oil dilution amount may assume that the difference between the estimated hydrocarbon content from 512 and the expected hydrocarbon content is diluted into the oil. At 516 this estimated oil dilution amount is applied to memory for use in other algorithms, for example by routine 400. Routine 500 then terminates.

FIG. 6 provides an example routine 600 for adjusting a commanded grille shutter position based on engine coolant temperature and an oil dilution amount. Routine 600 may be executed as part of a method which adjusts a front-end engine airflow based on engine coolant temperature, and responsive to an oil dilution amount greater than a threshold temperature, selectively adjusts the engine front-end airflow based on each of engine coolant temperature and the oil dilution amount. In such an example, adjusting the engine front-end airflow may includes one of increasing or decreasing the engine front-end airflow, and adjusting an engine front-end airflow adjusting device (e.g., adjustable grille shutters) from a first position to a second position.

As a specific example, increasing the airflow may include adjusting an engine front-end airflow adjusting device (e.g., an adjustable grille shutter) from a fully closed position to a fully open position, and decreasing the airflow may include adjusting the engine front-end airflow adjusting device from a fully open position to a fully closed position. However, as an alternate example, increasing the engine front-end airflow may include adjusting the engine front-end airflow adjusting device from a first mid-point position to a second mid-point position, the second mid-point position more open than the first, while decreasing the engine front-end airflow may include adjusting the engine front-end airflow adjusting device from a first mid-point position to a second mid-point position, the second mid-point position less open than the first.

Selectively adjusting the front-end engine airflow may include, if engine oil dilution is above the threshold amount but engine coolant temperature is greater than an upper threshold temperature, adjusting based on engine coolant temperature and not on the oil dilution amount. Selectively adjusting the front-end engine airflow may further include, if engine oil dilution is above the threshold amount but engine coolant temperature is less than a lower threshold temperature, adjusting based on engine coolant temperature and not the engine oil dilution amount. In this way, engine front-end airflow may be adjusted to control engine temperatures, and further flexibility may be used to address oil fuel in oil dilution.

In one example, routine 600 is executed as part of routine 300 at 318. Within the context of routine 300, a commanded position has already been determined at 312 and routine 600 is executed to further adjust the commanded position based on whether the oil dilution amount estimated at 314 is above or below the threshold level. Some of the steps of routine 300 have been incorporated into FIG. 6 for emphasis of the depicted method.

Routine 600 begins at 602 where it is determined whether ECT is great than an upper threshold temperature. If ECT is greater than the upper threshold temperature, routine 600 proceeds to 604 where the commanded position is not adjusted based on oil dilution, and thus the engine front-end airflow is only adjusted based on engine temperature. If ECT is less than the upper threshold temperature, routine 600 instead proceeds to 606.

At 606 it is determined whether ECT is less than a lower threshold temperature. If ECT is less than the lower threshold temperature, routine 600 proceeds to 608 where the commanded position is not adjusted based on oil dilution, and thus the engine front-end airflow is only adjusted based on engine temperature. If ECT is greater than the lower threshold temperature, routine 600 instead proceeds to 610.

At 610 it is determined whether the oil dilution amount is greater than the threshold amount. As one example, during conditions wherein push-side PCV flow is present, the oil dilution amount may be determined via intake oxygen sensor measurements, for instance via routine 500 as described with reference to FIG. 5. If the oil dilution amount is greater than the threshold amount, routine 600 proceeds to 612. At 612, the commanded position is further adjusted based on the oil dilution amount. In this way, responsive to oil dilution greater than a threshold amount, engine front-end airflow may be adjusted based on each of engine coolant temperature and oil dilution amount. After 612, routine 600 returns to routine 300, or in alternate examples, terminates.

In one example, adjusting the engine front-end airflow based on each of the coolant temperature and the oil dilution amount includes decreasing the engine front-end airflow in response to the coolant temperature at or below an upper threshold temperature and the oil dilution above the upper threshold amount, and increasing the engine front-end airflow in response to the coolant temperature above the upper threshold temperature and the oil dilution above the upper threshold amount.

Continuing at 610, if the engine oil dilution amount is below the threshold amount, the commanded position is not adjusted based on oil dilution at 614. In this way, the engine front-end airflow may be adjusted based on engine coolant temperature. After 614, routine 600 returns to routine 300, or in alternate examples, terminates.

FIG. 7 provides an example routine 700 for adjusting a commanded grille shutter position based on an oil dilution amount. Routine 700 includes, during a first condition, adjusting a commanded grille shutter position based on an estimated oil dilution, and during a second condition, selectively increasing durations of future commanded positions. Further, if the oil dilution amount does not fall below a threshold amount after a specified duration, the grille shutters are adjusted to be fully closed until the oil dilution amount is below the threshold amount. The first condition may include when the commanded position is less open than a specified upper threshold opening, while the second condition may include when the commanded position is at least as open as the upper threshold opening. Selectively increasing the durations of future commanded positions may include increasing durations of future commanded positions only when they are below a lower threshold opening. In one example, the upper threshold opening may be specified as 100% open (fully open), and the lower threshold opening may be specified as 0% open (fully closed).

In this way, if engine cooling is currently desired, fuel in oil dilution may be addressed at a later event when grille shutter closure is already desired. Note that the commanded position may based on ECT and acceleration/deceleration in addition to various engine operating conditions, and executing routine 700 may further adjust the commanded position based on an oil dilution amount. In one example, routine 700 may be executed as part of a method for adjusting a grille shutter opening based on an estimated oil dilution amount. Specifically, routine 700 may be executed as part of routine 300 at 318, the commanded position having been determined at 312. Routine 300 may then utilize the adjusted commanded position to adjust the grille shutter position at 320, or alternatively increase the duration of future commanded positions less than a threshold opening.

Routine 700 begins at 702 where a commanded position and an estimated oil dilution amount are received. In the depicted embodiment, receiving an estimated oil dilution amount includes receiving a desired grille shutter position associated with the estimated oil dilution amount. At 704, it is determined whether the commanded position is at least as open as the upper threshold opening described above. It will be understood that the upper threshold opening may be any value within the range of the grille shutters. The threshold level may be determined based on various engine conditions, including but not limited to engine coolant temperature, engine oil temperature, and ambient air temperature. As one example, the threshold level may be 90% open and commanded positions more open than the threshold level indicate a need for engine cooling via grille shutter air flow. If the commanded position is equal to or more closed than the threshold opening, routine proceeds to 706. If the commanded position is more open than the threshold opening, routine 700 proceeds to 708. In this way, fuel in oil dilution may be addressed when a commanded position is already a closed position based on other engine conditions, and addressing fuel in oil dilution may be delayed if the commanded position is an open position (e.g., for controlling engine temperatures).

At 706 the commanded position is adjusted based on an oil dilution amount. Adjusting the commanded position based on an oil dilution amount may include adjusting the commanded position based on a desired grille shutter opening associated with the estimated oil dilution amount. The desired grille shutter opening associated with the estimated oil dilution amount may decrease (i.e., be more closed) as the dilution amount increases. In one example, the commanded position may be adjusted from a closed position to a more closed position, the adjusted commanded position more open than the desired grille shutter opening based on the dilution amount. In an alternate example, the commanded position may be adjusted from an open position to an open position less open than the unadjusted commanded position. In this example, the adjusted commanded position is more open than the desired grille shutter opening based on the dilution amount. In a further example, the commanded position may have already been fully closed, and the commanded position is not adjusted. After 706, routine 700 proceeds to 709.

In other examples, adjusting the commanded position at 706 may include adjusting the duration of the commanded position. For example, if the commanded grille shutter position was fully closed based on vehicle acceleration and the position was commanded to be maintained until the end of the acceleration event, the engine controller may increase the duration so that the grille shutters are maintained at the fully closed position after the acceleration event has ended, thereby improving fuel vaporization in the crankcase.

Alternatively, at 708, the commanded position is not adjusted. Instead a command is executed to selectively increase the duration of future commanded positions. Specifically, if a future commanded position is more closed than a lower opening threshold, the controller may increase the duration for which this commanded position is held. As discussed above, the lower opening threshold may be 0%, or may be any closed position greater than 0%. In some examples, the duration of a specified number of future commanded positions more closed than the lower opening threshold may be increased. In other examples, all future commanded positions more closed than the lower opening threshold may be increased until the oil dilution amount is below the threshold amount. In some embodiments, if the lower threshold opening is greater than 0%, the future commanded positions may be adjusted to be more closed based on the oil dilution amount.

At 709 the routine waits for a specified duration for the intended effects of adjusting a grille shutter closing to be realized. As a non-limiting example, the specified duration may be determined based on a rate of engine coolant temperature rise, a rate of oil temperature rise, vehicle driving conditions, and vehicle speed. At 710, the oil dilution amount is estimated again to determine whether increased durations of closed grille shutter positions has reduced the oil dilution. If the oil dilution remains above the threshold after the specified waiting duration, the grille shutters may be fully closed at 714 until the oil dilution amount has fallen below the threshold amount. Alternatively, if the grille shutter position was already fully closed, the grille shutters may be maintained at fully closed until the oil dilution amount has fallen below the threshold amount.

After the estimated oil dilution amount has fallen below the threshold amount, routine 700 may terminate, or may return to a routine for adjusting a grille shutter position such as routine 300 at FIG. 3. In this way, the grille shutters may be maintained as fully closed until an estimated oil dilution amount falls below a threshold amount, and in response to the estimated dilution amount falling below the threshold amount, the grille shutter position may be adjusted based at least on engine coolant temperature.

FIG. 8 shows examples of adjusting grille shutters based on ECT, oil dilution level, and additional engine operating conditions. The sequence of FIG. 8 may be provided by the system of FIGS. 1-2 according to the method of FIG. 3. Specifically, graph 800 shows changes in grille shutter percentage opening at plot 810, changes in engine coolant temperature at plot 820, changes in pedal position at plot 830, and changes in the estimated oil dilution amount at plot 840. A lower threshold temperature T1 and an upper threshold temperature T2 are associated with ECT, and when ECT is greater than temperature T1 and less than temperature T2, ECT is referred to as being within the threshold temperature range. The pedal position (PP) may be one of the additional engine operating conditions that grille shutter position is based on when ECT is within the threshold temperature range. In the depicted example, a PP below threshold position PP1 correlates to vehicle deceleration, a PP above threshold position PP2 corresponds to vehicle acceleration, and any PP between the threshold positions corresponds to positions which maintains vehicle speed. In alternate embodiments, additional or alternative engine operating conditions, such as CAC efficiency, may be used to determine grille shutter position. Vertical markers t1-t5 represent times of interest during the operating sequence.

Prior to time t1, the ECT is greater than the lower threshold temperature T1, and less than the upper threshold temperature T2. The pedal position is greater than PP2, indicating acceleration. The grille shutter percentage opening is 0% such that the grille shutters are fully closed responsive to the engine coolant temperature being within the threshold temperature range and the detected vehicle acceleration, thereby blocking engine front-end airflow and improving vehicle aerodynamics. Other engine operating conditions which are not depicted, such as charge air cooler temperature, may also influence the current grille shutter opening. While oil dilution is depicted as below the threshold amount, the grille shutter opening may be adjusted to or maintained at a closed position responsive to acceleration regardless of the state of oil dilution. By blocking engine front-end airflow, temperatures within the engine compartment may increase.

At time t1, ECT increases above the threshold temperature T1. In response, grille shutter positions are determined based on ECT alone and not determined based on pedal position (i.e., acceleration/deceleration), oil dilution level, or any additional engine operating condition. Put another way, the engine front-end airflow may be increased in response to ECT greater than an upper threshold temperature regardless of the status of other operating conditions such as pedal position and oil dilution. Specifically, the airflow may be increased in response to a high ECT when pedal position indicates either of deceleration and acceleration, and when oil dilution is either above or below the threshold dilution amount. The percentage opening of the grille shutters increases as ECT increases after time t1, eventually reaching 100% open (e.g., the maximal percentage opening). In this way, engine front-end airflow is increased in response to engine coolant temperature greater than an upper threshold and vehicle acceleration.

At time t2, when the ECT decreases below the upper threshold temperature T2 and remains above the lower threshold temperature T1, the controller may recalibrate the grille shutter position based on engine coolant temperature in addition to vehicle acceleration/deceleration. In the depicted example, the grille shutter position is immediately recalibrated. However in other examples the grille shutter position may be gradually adjusted from a first position to the recalibrated position. Soon after time t2, pedal position drops below PP1, indicating deceleration. Oil dilution is below the threshold amount. Accordingly, responsive to deceleration and engine coolant temperature above the lower threshold temperature, engine airflow is increased by adjusting the grille shutters from a first midpoint position to a second midpoint position, the second midpoint position more open than the first. In this way, engine temperatures may be reduced in anticipation of a future vehicle acceleration.

At time t3, the estimated oil dilution amount rises above threshold amount 842. Additionally, pedal position indicates deceleration and ECT is within the threshold temperature range. Responsive to these conditions, the engine front-end airflow is decreased by reducing the grille shutter opening percentage. In the depicted example, the grille shutter position is adjusted from a first mid-point position to a second mid-point position, the second mid-point position more closed than the first. The airflow is further decreased as the oil dilution amount increases. Additionally, the second mid-point position is a closed position. In other examples, the grille shutter position may be adjusted to the fully closed position responsive to ECT within the threshold temperature range, detected deceleration, and an oil dilution amount above a threshold amount.

At time t4, the estimated oil dilution falls below the threshold amount. ECT is within the threshold temperature range, and PP is below PP1, indicating deceleration. In response to the ECT being below the upper threshold temperature, deceleration, and oil dilution amount being above the threshold amount, the grille shutter position is adjusted to a more open position to increase airflow. Further, as PP begins decreasing, the grille shutter position becomes more open. The grille shutter position is maintained at the more open position while pedal position continues to indicate deceleration.

At time t5, ECT falls below the lower threshold temperature T1. Pedal position still indicated deceleration and oil dilution is below the threshold amount. In response to ECT below the threshold temperature, the engine front-end airflow is reduced by adjusting the grille shutter opening to a more closed position. Specifically, the grille shutter is adjusted to the fully closed position. The engine front-end airflow may be reduced in response to ECT less than a lower threshold temperature regardless of the status of other operating conditions such as pedal position and oil dilution. Specifically, the airflow may be reduced in response to a low ECT when pedal position indicates either of deceleration and acceleration, and when oil dilution is either above or below the threshold dilution amount. In this way, engine coolant temperature may be maintained within a specified temperature range, and when this condition is satisfied, airflow may be controlled based on engine operating conditions such as acceleration/deceleration and oil dilution.

In this way, vehicle grille shutters may be adjusted based on ECT in order to provide cooling airflow to the engine. When ECT is below a threshold, the controller may adjust the grille shutters based on ECT and additional engine operating conditions. Furthermore, when an oil dilution amount is above a threshold, the grille shutters may be further adjusted based on the oil dilution amount. However, when ECT is above the threshold, the controller may adjust the grille shutters based on ECT only.

Thus a method is provided for an engine front-end airflow adjusting device, comprising adjusting the engine front-end airflow based on each of vehicle acceleration/deceleration and engine temperature, and in response to an oil dilution amount above an upper threshold, adjusting the engine front-end airflow based on each of vehicle acceleration/deceleration, engine temperature, and the oil dilution amount. As described above, the adjusting the airflow adjusting device based on each of vehicle acceleration/deceleration and engine temperature according to the provided method includes decreasing the engine front-end airflow in response to vehicle acceleration and coolant temperature below an upper threshold temperature, increasing the engine front-end airflow in response to vehicle acceleration and coolant temperature above an upper threshold temperature, increasing the engine front-end airflow in response to vehicle deceleration and coolant temperature above a lower threshold temperature, and decreasing the engine front-end airflow in response to vehicle deceleration and coolant temperature below a lower threshold temperature.

Further, adjusting the engine front-end airflow based on each of acceleration/deceleration, engine temperature, and the oil dilution includes: increasing the engine front-end airflow in response to vehicle acceleration, coolant temperature above an upper threshold temperature, and oil dilution above a threshold amount; increasing the engine front-end airflow in response to vehicle deceleration, coolant temperature above an upper threshold temperature, and oil dilution above a threshold amount; decreasing the engine front-end airflow in response to vehicle acceleration, coolant temperature below an upper threshold temperature, and oil dilution above a threshold amount; decreasing the engine front-end airflow in response to vehicle acceleration, coolant temperature above a lower threshold temperature, and oil dilution above a threshold amount; decreasing the engine front-end airflow in response to vehicle acceleration, coolant temperature below a lower threshold temperature, and oil dilution above a threshold amount; decreasing the engine front-end airflow in response to vehicle deceleration, coolant temperature below an upper threshold temperature, and oil dilution above a threshold amount; decreasing the engine front-end airflow in response to vehicle deceleration, coolant temperature above a lower threshold temperature, and oil dilution above a threshold amount; and decreasing the engine front-end airflow in response to vehicle deceleration, coolant temperature below a lower threshold temperature, and oil dilution above a threshold amount.

As a result, a technical effect of the invention is achieved by adjusting the grille shutters based on oil dilution amount, thereby providing a desired level of heating to the engine and increasing fuel vaporization in the crankcase when oil dilution is detected. Further, another technical effect of the invention is achieved by adjusting the grille shutters based on oil dilution amount in addition to other engine operating conditions such as acceleration/deceleration. As a result, engine performance and fuel economy may be improved while additionally addressing fuel in oil dilution.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
adjusting a grille shutter opening responsive to a fuel in oil dilution amount when an engine coolant temperature is below a threshold; and
adjusting the grille shutter opening based on the engine coolant temperature, independent of the fuel in oil dilution amount when the engine coolant temperature is above the threshold.

2. The method of claim 1, wherein the adjusting includes adjusting an angle of opening from a first mid-point position to a second, different, mid-point position.

3. The method of claim 2, wherein a mid-point position is an angle of opening between a fully open grille shutter and a fully closed grille shutter.

4. The method of claim 1, wherein the adjusting is responsive to an estimated fuel in oil dilution level, the estimate based on intake air oxygen sensor measurements.

5. The method of claim 1, wherein the adjusting is performed when push-side PCV flow is active, and not performed when push-side PCV flow is inactive.

6. The method of claim 5, further comprising:
in response to push-side PCV flow being inactive, selectively activating push-side PCV flow based on boost conditions.

7. The method of claim 1, wherein the adjusting is not performed when one or more of an EGR valve and a fuel vapor purge valve are open.

8. The method of claim 1, further comprising:
adjusting the grille shutter opening further based on a charge air cooler temperature and a vehicle acceleration/deceleration.

9. The method of claim 8, further comprising:
in response to the engine coolant temperature below a lower threshold, relative to the threshold, not adjusting the grille shutter opening responsive to the fuel in oil dilution amount.

10. A method for an engine front-end airflow adjusting device, comprising:
selectively adjusting an engine front-end airflow based on a coolant temperature, and
in response to an oil dilution amount above an upper threshold,
selectively adjusting the engine front-end airflow based on each of the coolant temperature and the oil dilution amount, the upper threshold based on one or more of a number of cold start operations without warm-up, the oil dilution amount, and an estimated hot cycle dilution at shutdown.

11. The method of claim 10, wherein adjusting the engine front-end airflow includes:
one of increasing or decreasing the engine front-end airflow, and
adjusting the engine front-end airflow adjusting device from a first position to a second position.

12. The method of claim 10, wherein
increasing airflow includes adjusting the engine front-end airflow adjusting device from a fully closed position to a fully open position, and
decreasing airflow includes adjusting the engine front-end airflow adjusting device from a fully open position to a fully closed position.

13. The method of claim 10, wherein
increasing the engine front-end airflow includes adjusting the engine front-end airflow adjusting device from a first mid-point position to a second mid-point position, the second mid-point position more open than the first, and
decreasing the engine front-end airflow includes adjusting the engine front-end airflow adjusting device from a first mid-point position to a second mid-point position, the second mid-point position less open than the first.

14. The method of claim 10, wherein adjusting the engine front-end airflow based on each of the coolant temperature and the oil dilution amount includes:
decreasing the engine front-end airflow in response to the coolant temperature at or below an upper threshold temperature and the oil dilution amount above the upper threshold, and
increasing the engine front-end airflow in response to the coolant temperature above the upper threshold temperature and the oil dilution amount above the upper threshold.

15. The method of claim 10, wherein the oil dilution amount is estimated via intake air oxygen sensor measurements during conditions wherein push-side PCV flow is active.

16. The method of claim 10, wherein the engine front-end airflow adjusting device is an adjustable grille shutter.

17. A method for an engine front-end airflow adjusting device, comprising:
adjusting an engine front-end airflow based on each of vehicle acceleration/deceleration and engine temperature, and
in response to an oil dilution amount above an upper threshold,
adjusting the engine front-end airflow based on each of acceleration/deceleration, engine temperature, and the oil dilution amount, the upper threshold based on one or more of a number of cold start operations without warm-up, the oil dilution amount, and an estimated hot cycle dilution at shutdown.

18. The method of claim 17, wherein adjusting the engine front-end airflow based on each of acceleration/deceleration and engine temperature includes:

decreasing the engine front-end airflow in response to a vehicle acceleration event and a coolant temperature below an upper threshold temperature, increasing the engine front-end airflow in response to a vehicle acceleration event and the coolant temperature above the upper threshold temperature, increasing the engine front-end airflow in response to a vehicle deceleration event and the coolant temperature above a lower threshold temperature, and decreasing the engine front-end airflow in response to vehicle acceleration and the coolant temperature below the lower threshold temperature.

19. The method of claim 17, wherein adjusting the engine front-end airflow based on each of fuel economy, temperature control, and the oil dilution amount includes:

increasing the engine front-end airflow in response to vehicle deceleration, coolant temperature above an upper threshold temperature, and oil dilution above a threshold;

increasing the engine front-end airflow in response to vehicle deceleration, coolant temperature above an upper threshold temperature, and oil dilution above a threshold; and decreasing the engine front-end airflow in response to vehicle deceleration, coolant temperature below an upper threshold temperature, and oil dilution above a threshold.

20. The method of claim 17, wherein the oil dilution amount is estimated via intake oxygen sensor measurements during conditions wherein push-side PCV flow is active.

\* \* \* \* \*